US011193908B2

(12) United States Patent
Choa et al.

(10) Patent No.: US 11,193,908 B2
(45) Date of Patent: Dec. 7, 2021

(54) MULTI-LAYER CERAMIC/METAL TYPE GAS SENSOR AND MANUFACTURING METHOD OF THE SAME

(71) Applicant: Industry-University Cooperation Foundation Hanyang University Erica Campus, Gyeonggi-do (KR)

(72) Inventors: Yong Ho Choa, Gyeonggi-do (KR); Hyo Ryoung Lim, Gyeonggi-do (KR); Yo Min Choi, Gyeonggi-do (KR); Nu Si A Eom, Gyeonggi-do (KR); Sungyoul Kim, Gyeonggi-do (KR)

(73) Assignee: INDUSTRY-UNIVERSITY COOPERATION FOUNDATION HANYANG UNIVERSITY ERICA CAMPUS, Gyeonggi-do (KR)

( * ) Notice: Subject to any disclaimer, the term of this patent is extended or adjusted under 35 U.S.C. 154(b) by 425 days.

(21) Appl. No.: 15/749,257

(22) PCT Filed: Jul. 22, 2016

(86) PCT No.: PCT/KR2016/008067
§ 371 (c)(1),
(2) Date: Jan. 31, 2018

(87) PCT Pub. No.: WO2017/022992
PCT Pub. Date: Feb. 9, 2017

(65) Prior Publication Data
US 2018/0224391 A1 Aug. 9, 2018

(30) Foreign Application Priority Data

Jul. 31, 2015 (KR) .................. 10-2015-0108636
Jun. 14, 2016 (KR) .................. 10-2016-0073529

(51) Int. Cl.
*G01N 27/409* (2006.01)
*B82B 1/00* (2006.01)
(Continued)

(52) U.S. Cl.
CPC ........... *G01N 27/409* (2013.01); *B82B 1/005* (2013.01); *B82B 3/0004* (2013.01); *G01N 27/127* (2013.01); *B82Y 15/00* (2013.01)

(58) Field of Classification Search
CPC .... G01N 27/127; G01N 27/407; B82B 1/005; B82B 1/00; B82B 3/0004; B82B 3/00; B82Y 15/00
See application file for complete search history.

(56) References Cited

U.S. PATENT DOCUMENTS

| 6,528,020 B1* | 3/2003 | Dai ......................... B82Y 40/00 |
| | | 422/98 |
| 2014/0041464 A1* | 2/2014 | Kim ........................ G01N 27/30 |
| | | 73/865.8 |
| 2015/0241386 A1* | 8/2015 | Kim ...................... G01N 27/125 |
| | | 73/31.06 |

FOREIGN PATENT DOCUMENTS

JP 5141775 B2 2/2013
KR 10-2011-0001713 A 1/2011
(Continued)

OTHER PUBLICATIONS

Korotcenkov (Materials Science and Engineering B 139,1-23, 2007 (Year: 2007).*
(Continued)

*Primary Examiner* — Gurpreet Kaur
(74) *Attorney, Agent, or Firm* — Stip Law Group, LLC

(57) ABSTRACT

The present invention relates to a gas sensor and a manufacturing method thereof. A sensor body of the gas sensor is formed by cutting a multi-layered ceramic/metal platform where a plurality of sequential layer structures of a ceramic dielectric material and metal are layered in a layering direction. The sensor body includes at least one layered body wherein a ceramic dielectric material, a first internal electrode, a ceramic dielectric material, and a second internal electrode are sequentially layered. The first internal electrode and the second internal electrode are exposed through a cut surface by cutting. The first internal electrode is electrically connected to a first electrode terminal disposed on a first side of the sensor body, and the second internal electrode is electrically connected to a second electrode terminal disposed on a second side of the sensor body facing the first side. The first and the second internal electrode are exposed to form a sensing surface on at least one side of the sensor body excluding a side where the first and the second electrode terminal are installed. A gas sensing material layer for gas detection is formed on a portion or an entire upper portion of the sensing surface, or a metal film whose contact (Continued)

resistance with the gas sensing material layer is lower than the first and the second internal electrode is formed on upper portions of the first and the second internal electrode which are exposed and a gas sensing material layer for gas detection is formed on a portion or an entire upper portion of the sensing surface where the metal film is formed.

9 Claims, 25 Drawing Sheets

(51) Int. Cl.
   *B82B 3/00*      (2006.01)
   *G01N 27/12*     (2006.01)
   *B82Y 15/00*     (2011.01)

(56) References Cited

FOREIGN PATENT DOCUMENTS

| KR | 20110001713 | * | 1/2011 | ............... B28B 3/00 |
| KR | 10-1113315 B1 | | 3/2012 | |
| KR | 10-2012-0109315 A | | 10/2012 | |
| KR | 10-1519971 B1 | | 5/2015 | |

OTHER PUBLICATIONS

International Search Report for related International Application No. PCT/KR2016/008067; report dated Nov. 4, 2016.

* cited by examiner

FIG. 13
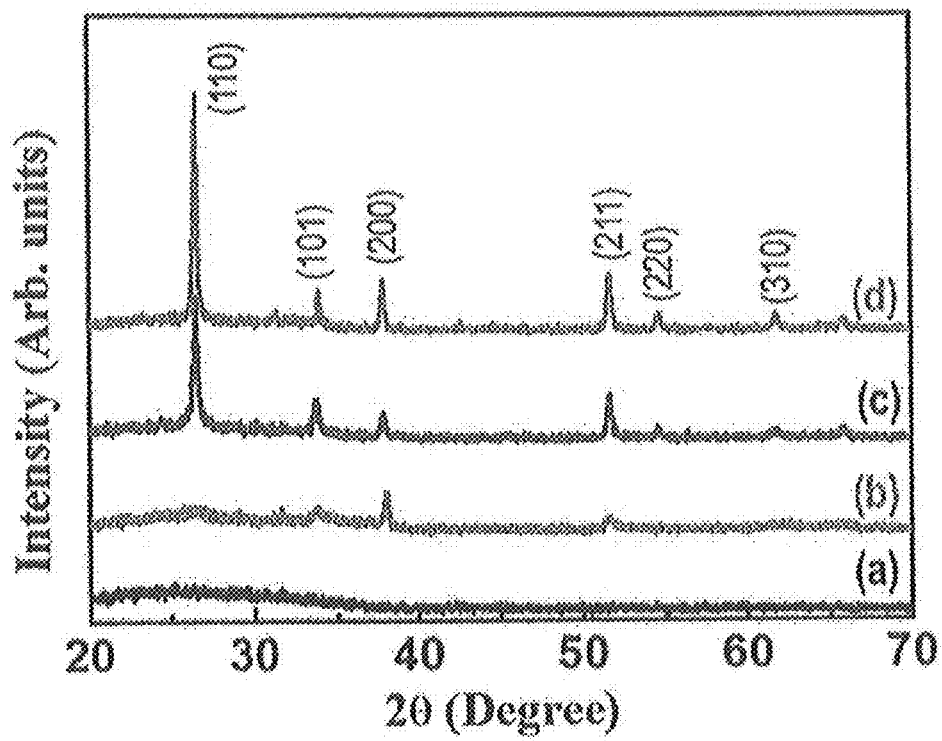
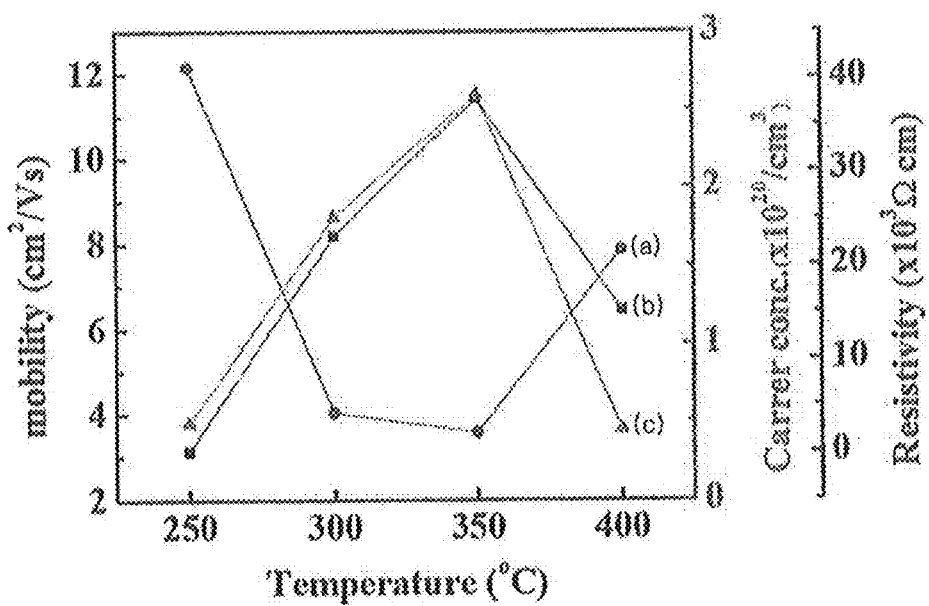
FIG. 14

*FIG. 19*
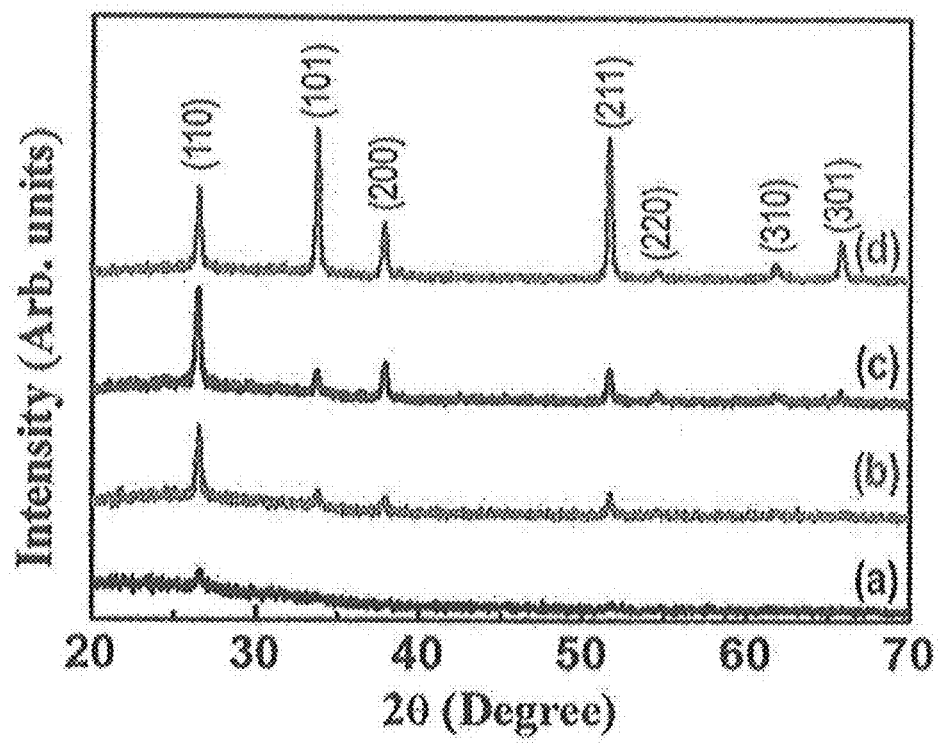
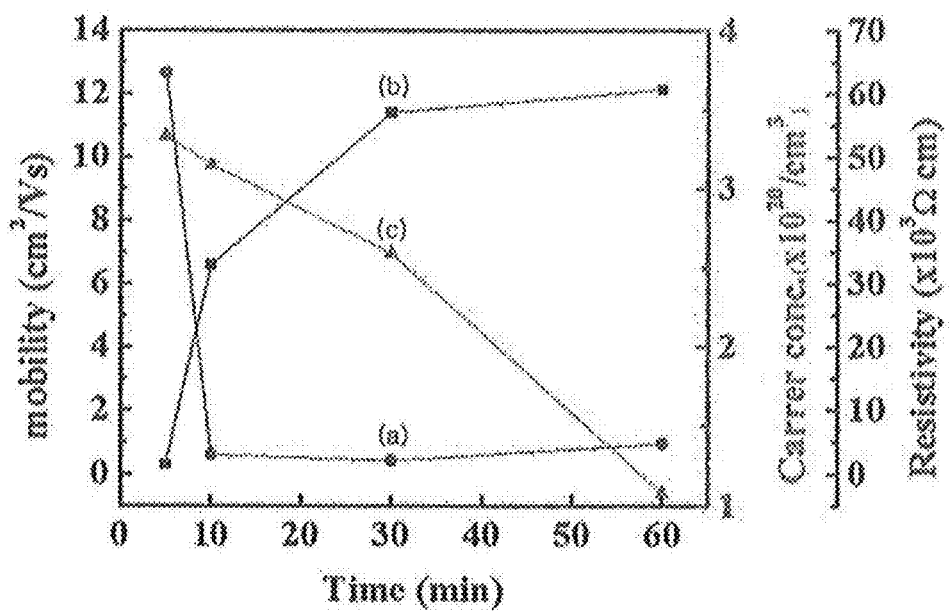
*FIG. 20*

*FIG. 21*
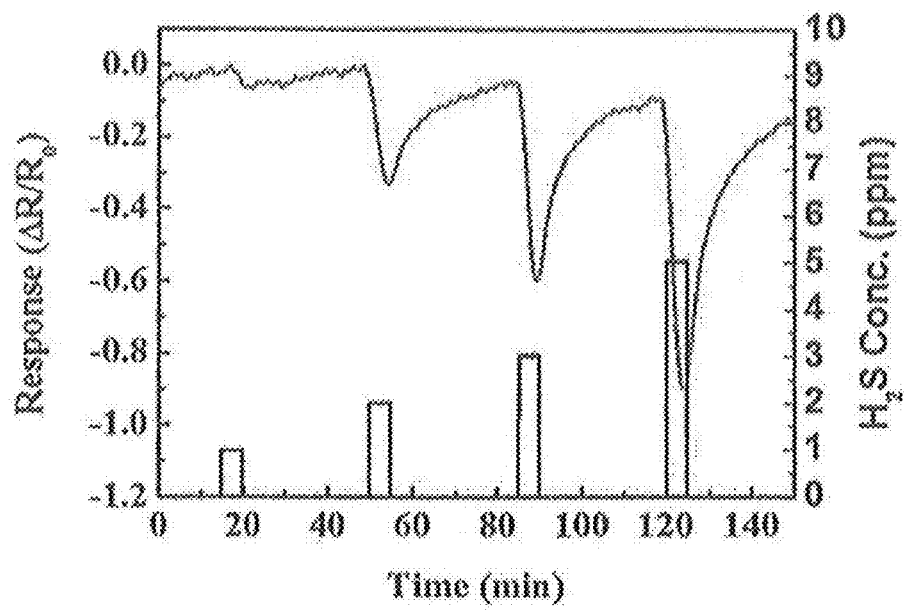
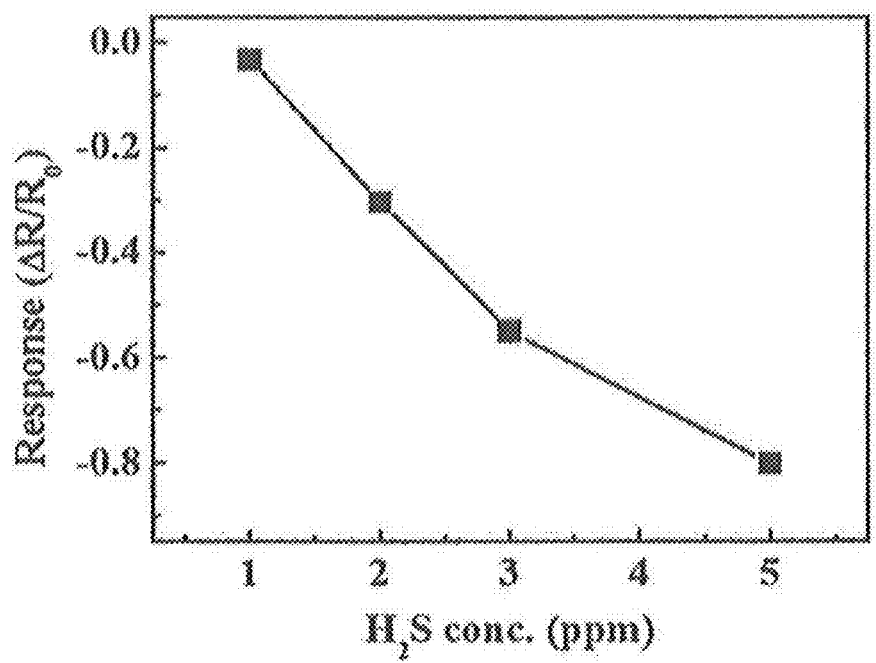
*FIG. 22*

FIG. 23
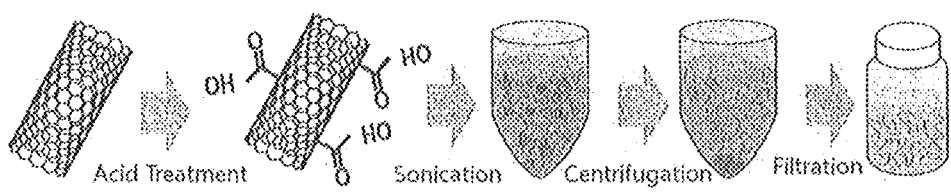
FIG. 24
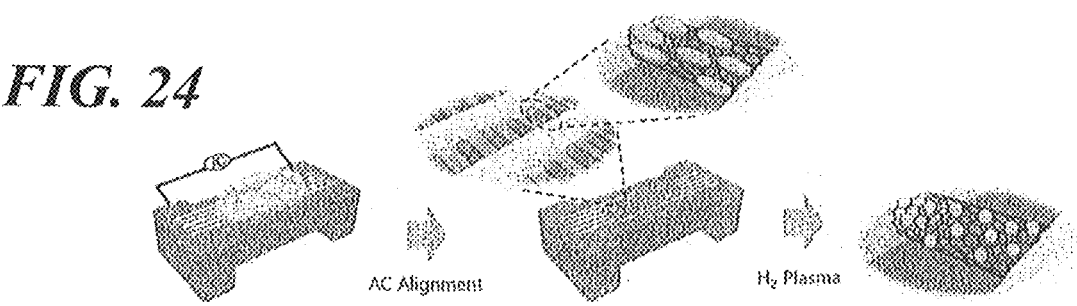
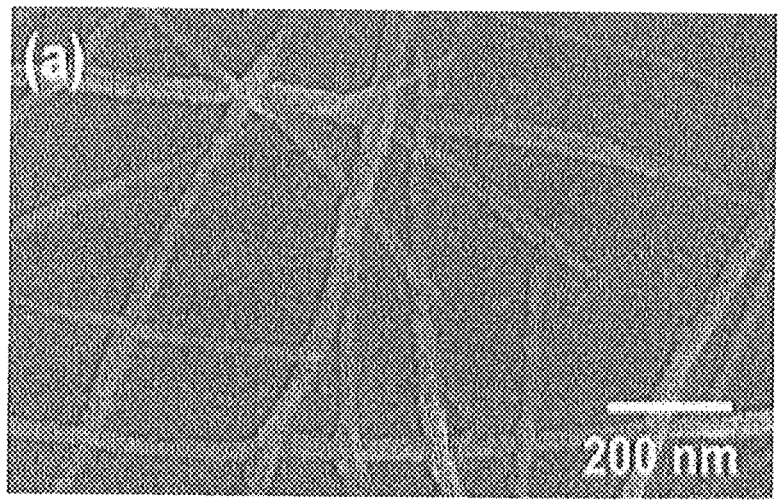
FIG. 25

FIG. 36
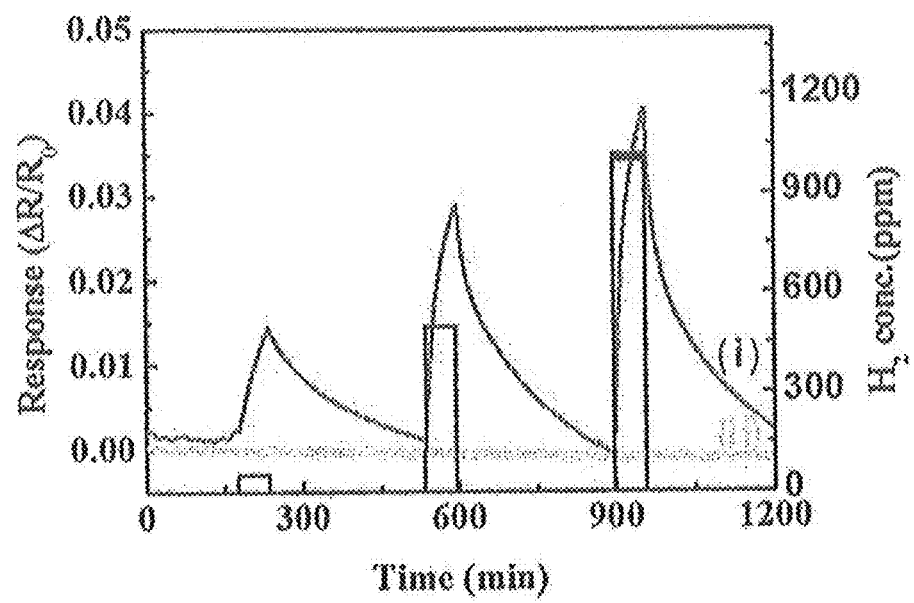
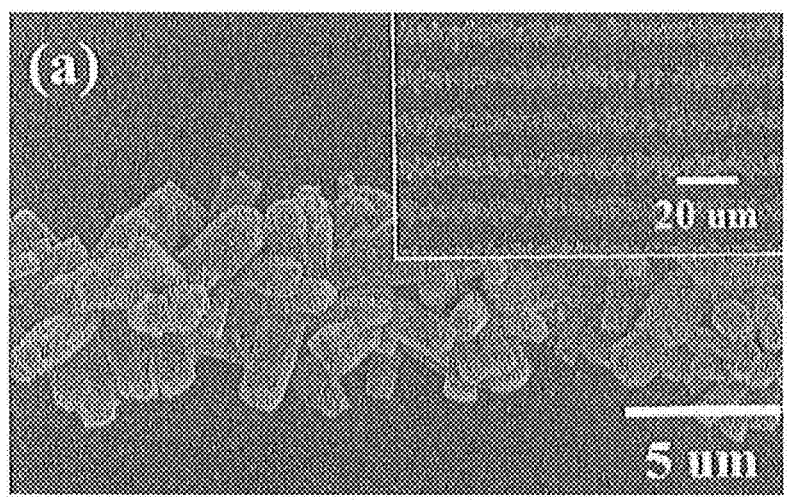
FIG. 37

MULTI-LAYER CERAMIC/METAL TYPE GAS SENSOR AND MANUFACTURING METHOD OF THE SAME

CROSS-REFERENCE TO RELATED APPLICATIONS

This application is a 35 USC § 371 US National Stage patent application of International Patent Application No. PCT/KR2016/008067 filed on Jul. 22, 2016, which claims priority to Korean Patent Application No. 10-2015-0108636 filed on Jul. 31, 2015 and Korean Patent Application No. 10-2016-0073529 filed on Jun. 14, 2016.

FIELD OF THE DISCLOSURE

A gas sensor capable of sensing a gas and a method of manufacturing the same, and more particularly, to a multi-layer ceramic/metal gas sensor, in which it is possible to mass-produce a sensor platform at low cost using a multi-layer ceramic/metal process (MLCP), it is easy to adjust thicknesses and the layered number of internal electrodes made of a metal and ceramic dielectrics, a structure in which internal electrodes spaced apart from each other are separated by ceramic dielectrics may prevent a short circuit and ensure long-term stability, a gas sensitive material layer is formed on a sensing surface on which the internal electrodes are exposed so that sensitivity may be improved, and various types of gas sensitive materials and deposition processes may be applied according to a target gas, and a method of manufacturing the same.

BACKGROUND OF THE DISCLOSURE

A gas sensor is a device which senses toxic gases, such as $NO_x$, CO, $H_2S$, $NH_3$, $SO_2$, and the like, and explosive gases, such as $H_2$, $CH_4$, and the like, using changes of physical, chemical, and electrical properties of materials and provides sensing results to a computer or a user. Recently, as new growth industries using Internet of Things (IoT), wearable technology, and the like have appeared, a demand for gas sensors is rapidly increasing.

Gas sensors are being converted and developed into thin film type micro sensors for price reduction, complexity, low power consumption, mass production, and the like. Since a thin film type micro sensor has a relatively thin sensor element and can form an integrated sensor array, the thin film type micro sensor is suitable for multifunction and light-weighting, thinning, shortening, and miniaturization. The thin film type micro sensor uses an interdigitated electrode (IDE) as a sensing electrode and has a high sensitivity characteristic compared to a sensor using a macro electrode. An IDE of a gas sensor includes two pairs of parallel metallic legs and electrode terminals, serves to transmit a change of an electrical signal due to gas contact, and is mainly formed by a photolithography or screen printing method.

When an IDE is formed using a photolithography method, because a high-vacuum process should be applied, a process cost is increased and processes becomes complicated, which makes industrialization difficult.

A screen printing method which is low in process cost and simple in process is introduced to the forming of the IDE so that a process cost may be reduced. However, when the screen printing method is applied, since a paste containing a binder is prepared and used, it is necessary to dry the IDE at a high temperature of 100° C. or more, and since due to two-dimensional shape characteristics, electrode short-circuit is likely to occur according to a temperature change while a sensor is driven, scattering of gas sensing properties may occur.

When nanoparticles are used as a gas sensitive material, as the diameter of nanoparticles decreases, a reaction area with a gas may increase, and thus sensitivity of the gas sensor may be improved, but the nanoparticles tend to aggregate to form secondary particles. It is difficult to ensure dispersibility of nanoparticles due to characteristics of a gas sensor used mainly in a high temperature atmosphere, and thus a reaction occurs only on the surface of secondary particles so that sensitivity is significantly lowered.

Therefore, inventors of the present invention have been studying to address dispersion problems by introducing nanowires and nanotubes. However, sensors using a single nanowire are difficult to manufacture and expensive to industrialize, and sensors in which a bundle nanowire network is synthesized and connected to sensing electrodes are easily short-circuited and have a long-term stability problem.

DOCUMENT OF RELATED ART

Patent Document

Korean Patent No. 10-1044306

SUMMARY OF THE INVENTION

The present invention is directed to providing a multi-layer ceramic/metal gas sensor, in which it is possible to mass-produce a sensor platform at low cost using a multi-layer ceramic/metal process (MLCP), it is easy to adjust thicknesses and the layered number of internal electrodes made of a metal and ceramic dielectrics, a structure in which internal electrodes spaced apart from each other are separated by ceramic dielectrics may prevent a short circuit and ensure long-term stability, a gas sensitive material layer is formed on a sensing surface on which the internal electrodes are exposed so that sensitivity may be improved, and various types of gas sensitive materials and deposition processes may be applied according to a target gas, and a method of manufacturing the same.

One aspect of the present invention provides a gas sensor including a sensor body, wherein the sensor body is formed by cutting a multi-layer ceramic/metal platform to which a multi-layer ceramic/metal process (MLCP) is applied in a layered direction in a form in which a plurality of sequential layer structures of a ceramic dielectric and a metal are layered, the sensor body includes at least one layered body in which a ceramic dielectric, a first internal electrode, a ceramic dielectric, and a second internal electrode are sequentially layered, the first internal electrode and the second internal electrode are exposed through a cut surface formed by the cutting, the first internal electrode is electrically connected to a first electrode terminal provided on a first side surface of the sensor body, the second internal electrode is electrically connected to a second electrode terminal provided on a second side surface of the sensor body facing the first side surface, the first internal electrode and the second internal electrode are exposed to form a sensing surface on at least one side surface of the sensor body excluding the side surfaces on which the first electrode terminal and the second electrode terminal are provided, and a gas sensitive material layer for gas detection is formed on a part or whole of the sensing surface, or metal films having a lower contact resistance with a gas sensitive material layer than the first and second internal electrodes are formed on the first internal electrode and the second internal electrode which are exposed, and a gas sensitive material layer for gas detection is formed on a part or whole of the sensing surface on which the metal films are formed.

The ceramic dielectric may include at least one ceramic selected from among alumina ($Al_2O_3$), magnesia (MgO), silica ($SiO_2$), zirconia ($ZrO_2$), and barium titanate ($BaTiO_3$).

The metal films may include at least one metal selected from among gold (Au), silver (Ag), zinc (Zn), copper (Cu), titanium (Ti), chromium (Cr), manganese (Mn), iron (Fe), cobalt (Co), aluminum (Al), platinum (Pt), palladium (Pd), iridium (Ir), magnesium (Mg), and cobalt (Co).

The gas sensitive material layer may include an oxide semiconductor capable of sensing a gas.

The oxide semiconductor may include at least one N-type semiconductor selected from among tin oxide ($SnO_2$), titanium oxide ($TiO_2$), zinc oxide (ZnO), tungsten oxide ($WO_3$), cadmium oxide (CdO), iron oxide ($Fe_2O_3$), and indium oxide ($In_2O_3$).

The oxide semiconductor may include at least one P-type semiconductor selected from among nickel oxide (NiO), copper oxide (CuO), chromium oxide ($Cr_2O_3$), and cobalt oxide ($Co_3O_4$).

The gas sensitive material layer may include carbon nanotubes capable of sensing a gas.

The carbon nanotubes may be coated with a catalyst for improving gas sensitivity.

The catalyst may include at least one metal selected from among platinum (Pt), palladium (Pd), gold (Au), silver (Ag), iridium (Ir), rhodium (Rh), and ruthenium (Ru).

The carbon nanotubes may be arranged so as to cross an arrangement of the metal films.

The gas sensitive material layer may include chalcogens formed by a galvanic replacement reaction of the first and second internal electrodes exposed on the sensing surface. The chalcogens may include at least one material selected from among selenium (Se) and tellurium (Te). The chalcogens may have a rod-type structure.

The gas sensitive material layer may include a chalcogenide formed by a galvanic replacement reaction, a topotactic reaction, and a cation exchange reaction of the first and second internal electrodes exposed on the sensing surface. The chalcogenide may include at least one chalcogen compound selected from among metal telluride, metal selenide, and metal sulfide. The chalcogenide may have a rod-type structure.

Another aspect of the present invention provides a method of manufacturing a gas sensor, wherein the method includes preparing a multi-layer ceramic/metal platform, wherein a plurality of sequential layer structures of a ceramic dielectric and a metal are layered, at least one layered body in which a ceramic dielectric, a first internal electrode, a ceramic dielectric, and a second internal electrode are sequentially layered is formed, the first internal electrode is electrically connected to a first electrode terminal provided on a first side surface, and the second internal electrode is electrically connected to a second electrode terminal provided on a second side surface facing the first side surface, forming a sensor body of the gas sensor by cutting the multi-layer ceramic/metal platform in a layered direction, wherein the first internal electrode and the second internal electrode are exposed through a cut surface formed by the cutting, and the first internal electrode and the second internal electrode are exposed to form a sensing surface on at least one side surface of the sensor body except the side surfaces on which the first electrode terminal and the second electrode terminal are provided, and applying or depositing a gas sensitive material for gas detection on a part or whole of the sensing surface, or forming metal films having a lower contact resistance with a gas sensitive material layer than the first and second internal electrodes on the first internal electrode and the second internal electrode which are exposed and applying or depositing a gas sensitive material for gas detection on a part or whole of the sensing surface on which the metal films are formed, wherein the sensor body includes at least one layered body in which a ceramic dielectric, a first internal electrode, a ceramic dielectric, and a second internal electrode are sequentially layered, the first internal electrode provided on the sensor body is electrically connected to the first electrode terminal provided on a first side surface of the sensor body, and the second internal electrode provided on the sensor body is electrically connected to the second electrode terminal provided on a second side surface of the sensor body facing the first side surface.

The ceramic dielectric may include at least one ceramic selected from among alumina ($Al_2O_3$), magnesia (MgO), silica ($SiO_2$), zirconia ($ZrO_2$), and barium titanate ($BaTiO_3$).

The metal films may be formed by plating at least one metal selected from among gold (Au), silver (Ag), zinc (Zn), copper (Cu), titanium (Ti), chromium (Cr), manganese (Mn), iron (Fe), cobalt (Co), aluminum (Al), platinum (Pt), palladium (Pd), iridium (Ir), magnesium (Mg), and cobalt (Co) using an electrodeposition method or an electroless deposition method.

The gas sensitive material layer may include an oxide semiconductor capable of sensing a gas.

The oxide semiconductor may include at least one N-type semiconductor selected from among tin oxide ($SnO_2$), titanium oxide ($TiO_2$), zinc oxide (ZnO), tungsten oxide ($WO_3$), cadmium oxide (CdO), iron oxide ($Fe_2O_3$), and indium oxide ($In_2O_3$).

The oxide semiconductor may include at least one P-type semiconductor selected from among nickel oxide (NiO), copper oxide (CuO), chromium oxide ($Cr_2O_3$), and cobalt oxide ($Co_3O_4$).

The oxide semiconductor may be formed using spray pyrolysis deposition (SPD), and the spray pyrolysis deposition may include covering a region except a region to be deposited with a mask, mounting a jig to which the sensor body is fixed on a rotation susceptor in a chamber and preheating the jig while rotating the jig, making a spray solution in which a metal precursor and a solvent are mixed, into a droplet (mist) form using an ultrasonic transducer, and introducing the droplet into the chamber using a carrier gas and forming an oxide semiconductor thin film.

The gas sensitive material layer may include carbon nanotubes capable of sensing a gas.

The carbon nanotubes may be coated with a catalyst for improving gas sensitivity.

The catalyst may include at least one metal selected from among platinum (Pt), palladium (Pd), gold (Au), silver (Ag), iridium (Ir), rhodium (Rh), and ruthenium (Ru).

A precursor of the catalyst may be mixed and dispersed in a suspension of the carbon nanotubes, a dispersion in which the precursor of the catalyst is mixed may be applied to a part or the whole of the sensing surface on which the metal films are exposed and may be dried, and the precursor of the catalyst may then be reduced to the catalyst by hydrogen plasma dry etching, and thus a catalyst with which the carbon nanotubes are coated may be obtained.

The suspension of the carbon nanotubes may be applied to a part or the whole of the sensing surface on which the metal films are exposed, and the carbon nanotubes may be arranged so as to cross an arrangement of the metal films by applying an alternating electric field and dried, and thus carbon nanotubes arranged to cross the arrangement of the metal films may be obtained.

The alternating electric field may be applied at a frequency of 60 kHz to 20 MHz, and an application time of the alternating electric field may range from 10 to 300 seconds.

The gas sensitive material layer may include chalcogens formed by a galvanic replacement reaction of the first and second internal electrodes exposed on the sensing surface. The chalcogens may include at least one material selected from among selenium (Se) and tellurium (Te). The chalcogens may have a rod-type structure.

A region except a region to be deposited may be electrically insulated in order to deposit a gas sensitive material on the first and second internal electrodes exposed on the sensing surface of the sensor body, the sensor body may be impregnated with a galvanic replacement solution to which a source of the chalcogens is added, and the chalcogens may be formed by a galvanic replacement reaction of the first and second internal electrodes exposed on the sensing surface.

In order to improve sensitivity and bonding force of the chalcogens having a rod-type structure and adjust the rod-type structure, cetyltrimethylammonium bromide (CTAB), polyoxometalates (POM), polyvinylpyrrolidone (PVP), poly diallyldimethyl ammonium chloride (PDDA), sodium dodecyl sulfate (SDS), or a mixture thereof may be further added to the galvanic replacement solution.

The gas sensitive material layer may include a chalcogenide formed by a galvanic replacement reaction, a topotactic reaction, and a cation exchange reaction of the first and second internal electrodes exposed on the sensing surface. The chalcogenide may include at least one chalcogen compound selected from among metal telluride, metal selenide, and metal sulfide. The chalcogenide may have a rod-type structure.

Advantageous Effects

According to the present invention, it is possible to mass-produce a sensor platform at low cost using a multi-layer ceramic/metal process (MLCP), it is easy to adjust thicknesses and the layered number of internal electrodes made of a metal and ceramic dielectrics, and a structure in which internal electrodes spaced apart from each other are separated by ceramic dielectrics may prevent a short circuit and ensure long-term stability.

A gas sensitive material layer is formed on a sensing surface on which the internal electrodes are exposed so that sensitivity can be improved, and various types of gas sensitive materials and deposition processes can be applied according to a target gas.

A metal having a lower contact resistance with a gas sensitive material layer than the internal electrodes can be deposited on the internal electrodes exposed on the sensing surface by electrodeposition or electroless deposition so that sensitivity can be improved. A gas sensitive material, such as a metal (or a metal alloy), an oxide semiconductor, carbon nanotubes (CNTs), or the like, capable of sensing a gas, can be applied to a part or the whole of the sensing surface on which the internal electrodes are exposed so that gas sensing properties can be improved.

In addition, galvanic replacement can be performed on the internal electrodes exposed on the sensing surface to grow chalcogens and form a gas sensitive material layer, and thus gas sensing properties can be improved. When the galvanic replacement is performed, the internal electrodes are formed in the form of a rod having a diameter of several nanometers to several tens of micrometers according to a reaction time, a concentration of an additive, or the like, and thus gas sensitivity can be improved.

Further, the internal electrodes exposed on the sensing surface can be converted into chalcogenides by galvanic replacement, a topotactic reaction, and a cation exchange reaction to form a gas sensitive material layer, and thus gas sensing properties can be improved.

Further, in the gas sensor of the present invention, various types of gas sensitive materials and deposition processes can be applied according to a target gas, a gas sensitive material layer can be formed using a metal (or a metal alloy), an oxide semiconductor, CNTs, chalcogens, a chalcogenide, or the like, capable of sensing a gas, and thus sensitivity, selectivity, and stability can be ensured.

Further, according to the present invention, since the multi-layer ceramic/metal platform to which an MLCP is applied can be simply cut and can be used as a sensor body, the manufacturing process can be simple and a manufacturing cost can be significantly reduced.

BRIEF DESCRIPTION OF THE DRAWINGS

FIGS. 9 to 12 are SEM photographs of a tin oxide ($SnO_2$) thin film deposited by spray pyrolysis deposition (SPD), wherein FIG. 9 shows a case in which deposition is performed at a process temperature of 250° C., FIG. 10 shows a case in which deposition is performed at a process temperature of 300° C., FIG. 11 shows a case in which deposition is performed at a process temperature of 350° C., and FIG. 12 shows a case in which deposition is performed at a process temperature of 400° C.

FIG. 13 is a graph showing X-ray diffraction (XRD) patterns of a tin oxide ($SnO_2$) thin film deposited by SPD.

FIG. 14 is a graph showing resistivity (see FIG. 14A), mobility (see FIG. 14B), and a carrier concentration (see FIG. 14C) of the tin oxide ($SnO_2$) thin film deposited by SPD under the process temperature conditions as shown in FIG. 13.

FIGS. 15 to 18 are SEM photographs of a tin oxide thin film deposited by SPD, wherein FIG. 15 shows a case in which deposition is performed at a process temperature of 350° C. for 5 minutes, FIG. 16 shows a case in which deposition is performed at a process temperature of 350° C. for 10 minutes, FIG. 16 shows a case in which deposition is performed at a process temperature of 350° C. for 30 minutes, and FIG. 16 shows a case in which deposition is performed at a process temperature of 350° C. for 60 minutes.

FIG. 19 is a graph showing XRD patterns of a tin oxide thin film deposited by SPD.

FIG. 20 is a graph showing resistivity (see FIG. 20A), mobility (see FIG. 20B), and a carrier concentration (see FIG. 20C) of a tin oxide thin film deposited by SPD.

FIGS. 21 and 22 are graphs showing hydrogen sulfide ($H_2S$) gas sensing properties of a deposited tin oxide thin film.

FIG. 23 is a view for describing a method of manufacturing a suspension in which single-wall carbon nanotubes (SWNTs) are dispersed.

FIG. 24 is a view showing a process of forming platinum catalysts on SWNTs.

FIGS. 25 to 28 are SEM photographs of SWNTs having platinum catalyst particles formed by hydrogen plasma processing (hydrogen plasma dry etching) at different powers.

FIG. 36 is a graph showing a resistance change of SWNTs with respect to hydrogen ($H_2$) gas.

FIGS. 37 to 40 are SEM photographs obtained by analyzing a shape of a tellurium structure (a tellurium deposition material) according to a galvanic replacement reaction time.

Figure 1:
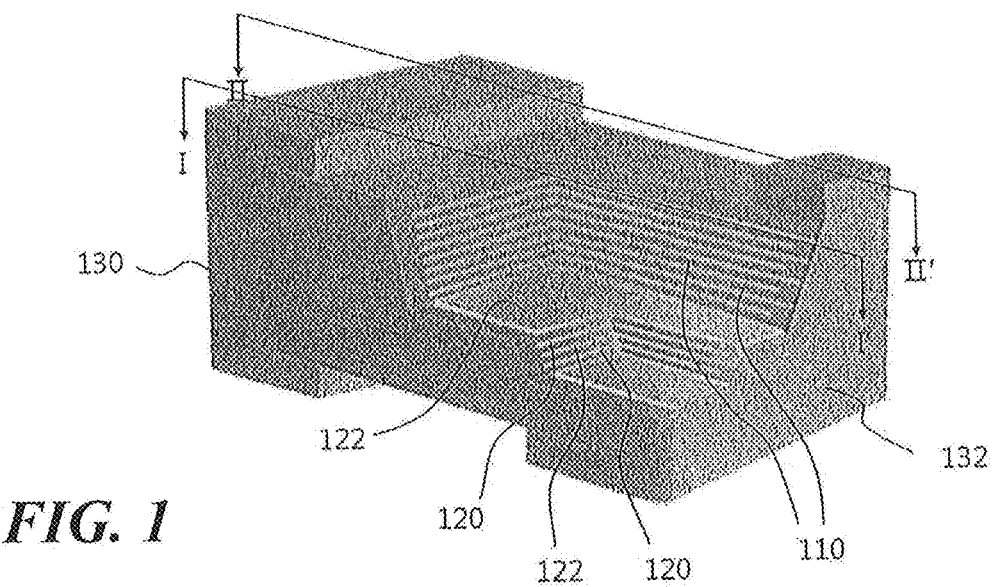
FIG. 1 is a view showing internal and external structures of a multi-layer ceramic/metal platform to which a multi-layer ceramic/metal process (MLCP) according to an embodiment is applied.

110: CERAMIC DIELECTRIC OF MULTI-LAYER CERAMIC/METAL PLATFORM
120: FIRST INTERNAL ELECTRODE OF MULTI-LAYER CERAMIC/METAL PLATFORM
122: SECOND INTERNAL ELECTRODE OF MULTI-LAYER CERAMIC/METAL PLATFORM
130: FIRST ELECTRODE TERMINAL OF MULTI-LAYER CERAMIC/METAL PLATFORM
132: SECOND ELECTRODE TERMINAL OF MULTI-LAYER CERAMIC/METAL PLATFORM
110A: CERAMIC DIELECTRIC OF GAS SENSOR
120A: FIRST INTERNAL ELECTRODE OF GAS SENSOR
122A: SECOND INTERNAL ELECTRODE OF GAS SENSOR
130A: FIRST ELECTRODE TERMINAL OF GAS SENSOR
132A: SECOND ELECTRODE TERMINAL OF GAS SENSOR
140: SENSING SURFACE OF GAS SENSOR
150: METAL FILM

DETAILED DESCRIPTION

A multi-layer ceramic/metal gas sensor according to an embodiment of the present invention includes a sensor body, wherein the sensor body is formed by cutting a multi-layer ceramic/metal platform to which a multi-layer ceramic/metal process (MLCP) is applied in a layered direction in a form in which a plurality of sequential layer structures of a ceramic dielectric and a metal are layered, the sensor body includes at least one layered body in which a ceramic dielectric, a first internal electrode, a ceramic dielectric, and a second internal electrode are sequentially layered, the first internal electrode and the second internal electrode are exposed through a cut surface formed by the cutting, the first internal electrode is electrically connected to a first electrode terminal provided on a first side surface of the sensor body, the second internal electrode is electrically connected to a second electrode terminal provided on a second side surface of the sensor body facing the first side surface, the first internal electrode and the second internal electrode are exposed to form a sensing surface on at least one side surface of the sensor body excluding the side surfaces on which the first electrode terminal and the second electrode terminal are provided, and a gas sensitive material layer for gas detection is formed on a part or whole of the sensing surface, or metal films having a lower contact resistance with a gas sensitive material layer than the first and second internal electrodes are formed on the first internal electrode and the second internal electrode which are exposed, and a gas sensitive material layer for gas detection is formed on a part or whole of the sensing surface on which the metal films are formed.

A method of manufacturing a multi-layer ceramic/metal gas sensor according to an embodiment of the present invention includes preparing a multi-layer ceramic/metal platform, wherein a plurality of sequential layer structures of a ceramic dielectric and a metal are layered, at least one layered body in which a ceramic dielectric, a first internal electrode, a ceramic dielectric, and a second internal electrode are sequentially layered is formed, the first internal electrode is electrically connected to a first electrode terminal provided on a first side surface, and the second internal electrode is electrically connected to a second electrode terminal provided on a second side surface facing the first side surface, forming a sensor body of the gas sensor by cutting the multi-layer ceramic/metal platform in a layered direction, wherein the first internal electrode and the second internal electrode are exposed through a cut surface formed by the cutting, and the first internal electrode and the second internal electrode are exposed to form a sensing surface on at least one side surface of the sensor body except the side surfaces on which the first electrode terminal and the second electrode terminal are provided, and applying or depositing a gas sensitive material for gas detection on a part or whole of the sensing surface, or forming metal films having a lower contact resistance with a gas sensitive material layer than the first and second internal electrodes on the first internal electrode and the second internal electrode which are exposed and applying or depositing a gas sensitive material for gas detection on a part or whole of the sensing surface on which the metal films are formed, wherein the sensor body includes at least one layered body in which a ceramic dielectric, a first internal electrode, a ceramic dielectric, and a second internal electrode are sequentially layered, the first internal electrode provided on the sensor body is electrically connected to a first electrode terminal provided on a first side surface of the sensor body, and the second internal electrode provided on the sensor body is electrically connected to a second electrode terminal provided on a second side surface of the sensor body facing the first side surface.

MODES OF THE INVENTION

Hereinafter, embodiments of the present invention will be described in detail with reference to the accompanying drawings. However, it should be understood that the following embodiments are provided so that those skilled in the art will be able to fully understand the present invention, can be modified in different forms, and the scope of the present invention is not limited to the embodiments described below. In the drawings, like reference numerals refer to like elements.

Hereinafter, the term "nano" refers to a size of 1 to 1,000 nm as a size of a nanometer (nm) unit, and the term "micro" refers to a size of 1 to 1,000 μm as a size of a micrometer (μm) unit. Further, the term "nanorod" refers to a rod having a diameter of 1 to 1,000 nm, and the term "micro rod" refers to a rod having a diameter of 1 to 1,000 μm.

A gas sensor senses toxic gases, such as $NO_x$, CO, $H_2S$, $NH_3$, $SO_2$, and the like, and explosive gases, such as $H_2$, $CH_4$, and the like, using changes of physical, chemical, and electrical properties of materials.

The present invention discloses a gas sensor, in which ceramics and a metal are alternately layered, a multi-layer ceramic/metal platform in which a metal is deposited on a pair of side walls facing each other to form electrode terminals electrically connected to the metal is formed, the multi-layer ceramic/metal platform is cut in a direction (a layered direction) perpendicular to a layered surface to expose metal lines at a cut surface, so that a sensing surface is formed, and the exposed metal wires are used as internal electrodes, and a method of manufacturing the same.

A metal having a lower contact resistance with a gas sensitive material layer than the internal electrodes may be deposited on the internal electrodes exposed on the sensing surface by electrodeposition or electroless deposition so that sensitivity may be improved. A gas sensitive material, such as a metal (or a metal alloy), an oxide semiconductor, carbon nanotubes (CNTs), or the like, capable of sensing a gas, may be applied to a part or the whole of the sensing surface on which the internal electrodes are exposed so that gas sensing properties may be improved.

In addition, galvanic replacement may be performed on the internal electrodes exposed on the sensing surface to grow chalcogens and form a gas sensitive material layer, and thus gas sensing properties may be improved. When the galvanic replacement is performed, the internal electrodes are formed in the form of a rod having a diameter of several nanometers to several tens of micrometers according to a reaction time, a concentration of an additive, or the like, and thus gas sensitivity may be improved.

Further, the internal electrodes exposed on the sensing surface may be converted into chalcogenides by galvanic replacement, a topotactic reaction, and a cation exchange reaction to form a gas sensitive material layer, and thus gas sensing properties may be improved.

According to the present invention, it is possible to mass-produce a sensor platform at low cost using a multi-layer ceramic/metal process (MLCP), it is easy to adjust thicknesses and the layered number of internal electrodes made of a metal and ceramic dielectrics, and a structure in which internal electrodes spaced apart from each other are separated by ceramic dielectrics may prevent a short circuit and ensure long-term stability. A gas sensitive material layer is formed on a sensing surface on which the internal electrodes are exposed so that sensitivity may be improved, and various types of gas sensitive materials and deposition processes may be applied according to a target gas.

In such a gas sensor, various types of gas sensitive materials and deposition processes may be applied according to a target gas, the gas sensitive material layer may be formed using a metal (or a metal alloy), an oxide semiconductor, CNTs, chalcogens, a chalcogenide, or the like, capable of sensing a gas, and thus sensitivity, selectivity, and stability may be ensured.

A multi-layer ceramic/metal gas sensor according to an embodiment of the present invention includes a sensor body, wherein the sensor body is formed by cutting a multi-layer ceramic/metal platform to which a multi-layer ceramic/metal process (MLCP) is applied in a layered direction in a form in which a plurality of sequential layer structures of a ceramic dielectric and a metal are layered, the sensor body includes at least one layered body in which a ceramic dielectric, a first internal electrode, a ceramic dielectric, and a second internal electrode are sequentially layered, the first internal electrode and the second internal electrode are exposed through a cut surface formed by the cutting, the first internal electrode is electrically connected to a first electrode terminal provided on a first side surface of the sensor body, the second internal electrode is electrically connected to a second electrode terminal provided on a second side surface of the sensor body facing the first side surface, the first internal electrode and the second internal electrode are exposed to form a sensing surface on at least one side surface of the sensor body excluding the side surfaces on which the first electrode terminal and the second electrode terminal are provided, and a gas sensitive material layer for gas detection is formed on a part or whole of the sensing surface, or metal films having a lower contact resistance with a gas sensitive material layer than the first and second internal electrodes are formed on the first internal electrode and the second internal electrode which are exposed, and a gas sensitive material layer for gas detection is formed on a part or whole of the sensing surface on which the metal films are formed.

The ceramic dielectric may include at least one ceramic selected from among alumina ($Al_2O_3$), magnesia (MgO), silica ($SiO_2$), zirconia ($ZrO_2$), and barium titanate ($BaTiO_3$).

The metal films may include at least one metal selected from among gold (Au), silver (Ag), zinc (Zn), copper (Cu), titanium (Ti), chromium (Cr), manganese (Mn), iron (Fe), cobalt (Co), aluminum (Al), platinum (Pt), palladium (Pd), iridium (Ir), magnesium (Mg), and cobalt (Co).

The gas sensitive material layer may include an oxide semiconductor capable of sensing a gas.

The oxide semiconductor may include at least one N-type semiconductor selected from among tin oxide ($SnO_2$), titanium oxide ($TiO_2$), zinc oxide (ZnO), tungsten oxide ($WO_3$), cadmium oxide (CdO), iron oxide ($Fe_2O_3$), and indium oxide ($In_2O_3$).

The oxide semiconductor may include at least one P-type semiconductor selected from among nickel oxide (NiO), copper oxide (CuO), chromium oxide ($Cr_2O_3$), and cobalt oxide ($Co_3O_4$).

The gas sensitive material layer may include CNTs capable of sensing a gas.

The CNTs may be coated with a catalyst for improving gas sensitivity.

The catalyst may include at least one metal selected from among platinum (Pt), palladium (Pd), gold (Au), silver (Ag), iridium (Ir), rhodium (Rh), and ruthenium (Ru).

The CNTs may be arranged so as to cross an arrangement of the metal films.

The gas sensitive material layer may include chalcogens formed by a galvanic replacement reaction of the first and second internal electrodes exposed on the sensing surface, and the chalcogens may have a rod-type structure. The chalcogens may include at least one material selected from among selenium (Se) and tellurium (Te).

The gas sensitive material layer may include a chalcogenide formed by a galvanic replacement reaction, a topotactic reaction, and a cation exchange reaction of the first and second internal electrodes exposed on the sensing surface, and the chalcogenide may have a rod-type structure. The chalcogenide may include at least one chalcogen compound selected from among metal telluride, metal selenide, and metal sulfide.

A method of manufacturing a multi-layer ceramic/metal gas sensor according to an embodiment of the present invention includes preparing a multi-layer ceramic/metal platform, wherein a plurality of sequential layer structures of a ceramic dielectric and a metal are layered, at least one layered body in which a ceramic dielectric, a first internal electrode, a ceramic dielectric, and a second internal electrode are sequentially layered is formed, the first internal electrode is electrically connected to a first electrode terminal provided on a first side surface, and the second internal electrode is electrically connected to a second electrode terminal provided on a second side surface facing the first side surface, forming a sensor body of the gas sensor by cutting the multi-layer ceramic/metal platform in a layered direction, wherein the first internal electrode and the second internal electrode are exposed through a cut surface formed by the cutting, and the first internal electrode and the second internal electrode are exposed to form a sensing surface on at least one side surface of the sensor body except the side surfaces on which the first electrode terminal and the second electrode terminal are provided, and applying or depositing a gas sensitive material for gas detection on a part or whole of the sensing surface, or forming metal films having a lower contact resistance with a gas sensitive material layer than the first and second internal electrodes on the first internal electrode and the second internal electrode which are exposed and applying or depositing a gas sensitive material for gas detection on a part or whole of the sensing surface on which the metal films are formed, wherein the sensor body includes at least one layered body in which a ceramic dielectric, a first internal electrode, a ceramic dielectric, and a second internal electrode are sequentially layered, the first internal electrode provided on the sensor body is electrically connected to a first electrode terminal provided on a first side surface of the sensor body, and the second internal electrode provided on the sensor body is electrically connected to a second electrode terminal provided on a second side surface of the sensor body facing the first side surface.

The ceramic dielectric may include at least one ceramic selected from among alumina ($Al_2O_3$), magnesia (MgO), silica ($SiO_2$), zirconia ($ZrO_2$), and barium titanate ($BaTiO_3$).

The metal films may be formed by plating at least one metal selected from among gold (Au), silver (Ag), zinc (Zn), copper (Cu), titanium (Ti), chromium (Cr), manganese (Mn), iron (Fe), cobalt (Co), aluminum (Al), platinum (Pt), palladium (Pd), iridium (Ir), magnesium (Mg), and cobalt (Co) by an electrodeposition method or an electroless deposition method.

The gas sensitive material layer may include an oxide semiconductor capable of sensing a gas.

The oxide semiconductor may include at least one N-type semiconductor selected from among tin oxide ($SnO_2$), titanium oxide ($TiO_2$), zinc oxide (ZnO), tungsten oxide ($WO_3$), cadmium oxide (CdO), iron oxide ($Fe_2O_3$), and indium oxide ($In_2O_3$).

The oxide semiconductor may include at least one P-type semiconductor selected from among nickel oxide (NiO), copper oxide (CuO), chromium oxide ($Cr_2O_3$), and cobalt oxide ($Co_3O_4$).

The oxide semiconductor may be formed by spray pyrolysis deposition (SPD), and the SPD may include a step of covering a region except a region to be deposited, with a mask, a step of mounting a jig to which the sensor body is fixed on a rotation susceptor inside a chamber and preheating the jig while rotating the jig, a step of making a spray solution in which a metal precursor and a solvent are mixed in a droplet (mist) form using an ultrasonic transducer, and a step of introducing the droplet into the chamber using a carrier gas and forming an oxide semiconductor thin film.

The gas sensitive material layer may include CNTs capable of sensing a gas.

The CNTs may be coated with a catalyst for improving gas sensitivity.

The catalyst may include at least one metal selected from among platinum (Pt), palladium (Pd), gold (Au), silver (Ag), iridium (Ir), rhodium (Rh), and ruthenium (Ru).

A precursor of the catalyst may be mixed and dispersed in a suspension of the CNTs, a dispersion in which the precursor of the catalyst is mixed may be applied to a part or the whole of the sensing surface on which the metal films are exposed, and dried, the precursor of the catalyst may then be reduced to the catalyst by hydrogen plasma dry etching, and thus the catalyst coated on the CNTs may be obtained.

The suspension of the CNTs may be applied to a part or the whole of the sensing surface on which the metal films are exposed, the CNTs may be arranged so as to cross an arrangement of the metal films by applying an alternating electric field, and dried, and thus the CNTs arranged so as to cross the arrangement of the metal films may be obtained.

The alternating electric field is applied at a frequency of 60 kHz to 20 MHz, and an application time of the alternating electric field preferably ranges from 10 to 300 seconds.

The gas sensitive material layer may include chalcogens formed by a galvanic replacement reaction of the first and second internal electrodes exposed on the sensing surface. The chalcogens may include at least one material selected from among selenium (Se) and tellurium (Te). The chalcogens may have a rod-type structure.

A region except a region to be deposited may be electrically insulated in order to deposit a gas sensitive material to the first and second internal electrodes exposed on the sensing surface of the sensor body, the sensor body may be impregnated with a galvanic replacement solution to which a source of the chalcogens is added, and thus the chalcogens may be formed by the galvanic replacement reaction of the first and second internal electrodes exposed on the sensing surface.

In order to increase sensitivity and bonding force of chalcogens having a rod-type structure and to adjust the rod-type structure, cetyltrimethylammonium bromide (CTAB), polyoxometalates (POM), polyvinylpyrrolidone (PVP), poly diallyldimethyl ammonium chloride (PDDA), sodium dodecyl sulfate (SDS), or a mixture thereof may be further added to the galvanic replacement solution.

The gas sensitive material layer may include a chalcogenide formed by a galvanic replacement reaction, a topotactic reaction, and a cation exchange reaction of the first and second internal electrodes exposed on the sensing surface. The chalcogenide may include at least one chalcogen compound selected from among metal telluride, metal selenide, and metal sulfide. The chalcogenide may have a rod-type structure.

Hereinafter, a multi-layer ceramic/metal gas sensor according to an embodiment of the present invention will be described in more detail.

The gas sensor according to the embodiment of the present invention may be manufactured using a multilayer ceramic/metal platform to which an MLCP is applied.

Figure 2:
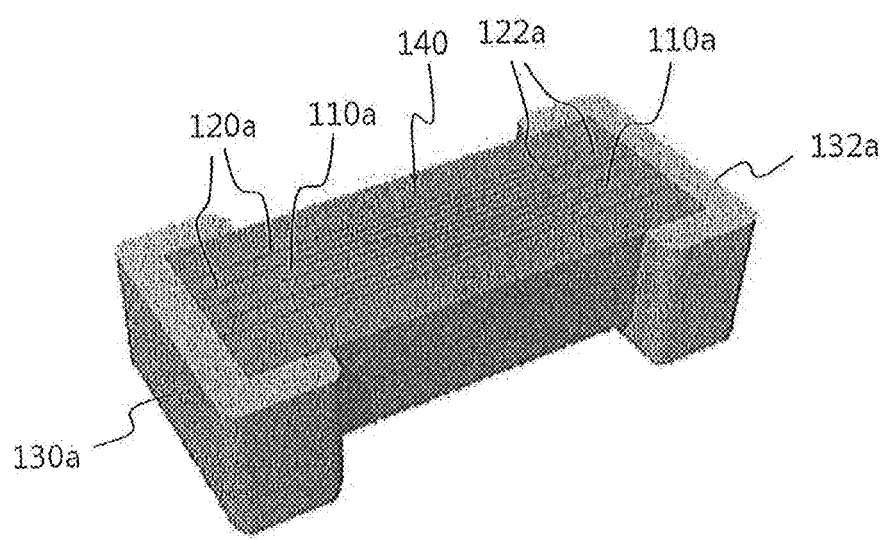
FIG. 2 is a view showing a state in which a sensor body is formed using a multi-layer ceramic/metal platform.
Figure 3:
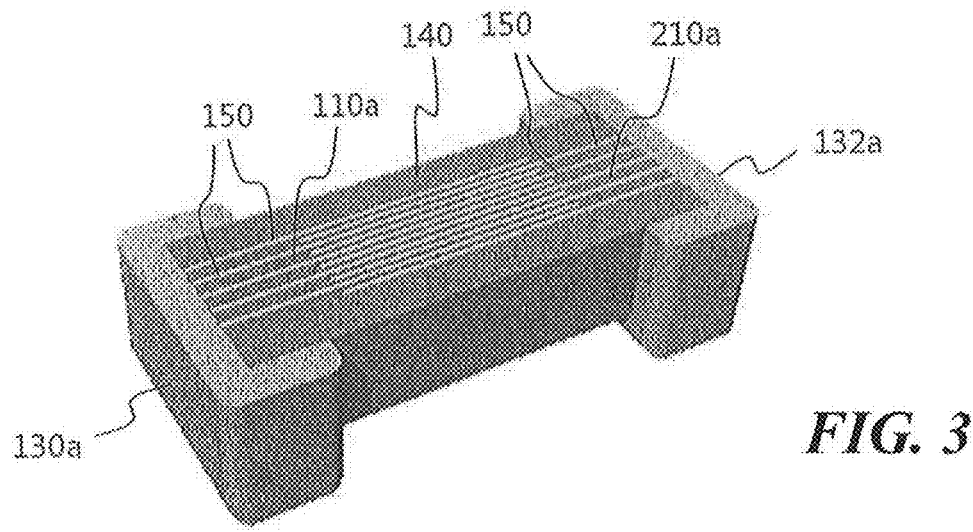
FIG. 3 is a view showing a structure of a sensor body in which metal films having a lower contact resistance with a gas sensitive material layer than internal electrodes are formed on the internal electrodes exposed through a sensing surface.

FIG. 1 is a view showing internal and external structures of a multi-layer ceramic/metal platform to which an MLCP according to an embodiment is applied. FIG. 2 is a view showing a state in which a sensor body is formed using a multi-layer ceramic/metal platform. FIG. 3 is a view showing a structure of a sensor body in which metal films having a lower contact resistance with a gas sensitive material layer than internal electrodes are formed on the internal electrodes exposed through a sensing surface.

Referring to FIGS. 1 to 3, in the multi-layer ceramic/metal platform to which an MLCP is applied, a plurality of sequential layer structures of a ceramic dielectric and a metal are layered, and the metal used as internal electrodes 120 and 122 is electrically connected to electrode terminals 130 and 132 formed at both ends of the multi-layer ceramic/metal platform. The multi-layer ceramic/metal platform includes at least one layered body in which a ceramic dielectric 110, a first internal electrode 120, a ceramic dielectric 110, and a second internal electrode 122 are sequentially layered. The first internal electrodes 120 are electrically connected to a first electrode terminal 130 provided on a first side surface, and the second internal electrodes 122 are electrically connected to a second electrode terminal 132 provided on a second side surface facing the first side surface.

In the gas sensor according to the embodiment of the present invention, the multi-layer ceramic/metal platform in which the plurality of sequential layer structures of a ceramic dielectric and a metal are layered is cut in a layered direction to form a sensor body of the gas sensor. First internal electrodes $120a$ and second internal electrodes $122a$ are exposed through a cut surface by the cutting.

The sensor body includes at least one layered body in which a ceramic dielectric $110a$, the first internal electrode $120a$, a ceramic dielectric $110a$, and the second internal electrode $122a$ are sequentially layered. The ceramic dielectric $110a$ may include at least one ceramic selected from among alumina ($Al_2O_3$), magnesia (MgO), silica ($SiO_2$), zirconia ($ZrO_2$), and barium titanate ($BaTiO_3$). The first and second internal electrodes $120a$ and $122a$ may be made of a metal, such as gold (Au), silver (Ag), zinc (Zn), nickel (Ni), copper (Cu), titanium (Ti), chromium (Cr), manganese (Mn), iron (Fe), cobalt (Co), aluminum (Al), platinum (Pt), palladium (Pd), iridium (Ir), magnesium (Mg), cobalt (Co), or the like.

The first internal electrodes $120a$ are electrically connected to a first electrode terminal $130a$ (or a first external electrode) provided on the first side surface of the sensor body, and the second internal electrodes $122a$ are electrically connected to a second electrode terminal $132a$ (or a second external electrode) provided on the second side surface of the sensor body facing the first side surface.

The first internal electrodes $120a$ and the second internal electrodes $122a$ are exposed to at least one side surface except the side surfaces of the sensor body on which the first electrode terminal $130a$ and the second electrode terminal $132a$ are provided, to form a sensing surface 140.

A gas sensitive material layer for gas detection is formed on a part or whole of the sensing surface 140, or metal films 150 having a lower contact resistance with a gas sensitive material layer than the first and second internal electrodes $120a$ and $122a$ is formed on the exposed first and second internal electrodes $120a$ and $122a$ and a gas sensitive material layer for gas detection is formed on a part or whole of the sensing surface 140 on which the metal films 150 are formed.

The metal films 150 may include at least one metal selected from among gold (Au), silver (Ag), zinc (Zn), copper (Cu), titanium (Ti), chromium (Cr), manganese (Mn), iron (Fe), cobalt (Co), aluminum (Al), platinum (Pt), palladium (Pd), iridium (Ir), magnesium (Mg), and cobalt (Co).

The gas sensitive material layer may include an oxide semiconductor capable of sensing a gas.

The oxide semiconductor may include at least one N-type semiconductor selected from among tin oxide ($SnO_2$), titanium oxide ($TiO_2$), zinc oxide (ZnO), tungsten oxide ($WO_3$), cadmium oxide (CdO), iron oxide ($Fe_2O_3$), and indium oxide ($In_2O_3$).

The oxide semiconductor may include at least one P-type semiconductor selected from among nickel oxide (NiO), copper oxide (CuO), chromium oxide ($Cr_2O_3$), and cobalt oxide ($Co_3O_4$).

The gas sensitive material layer may include CNTs capable of sensing a gas.

The CNTs may be coated with a catalyst for improving gas sensitivity.

The catalyst may include at least one metal selected from among platinum (Pt), palladium (Pd), gold (Au), silver (Ag), iridium (Ir), rhodium (Rh), and ruthenium (Ru).

The CNTs may be arranged so as to cross an arrangement of the metal films 150.

The gas sensitive material layer may include chalcogens formed by a galvanic replacement reaction of the first and second internal electrodes $120a$ and $122a$ exposed on the sensing surface 140. The chalcogens may include at least one material selected from among selenium (Se) and tellurium (Te). The chalcogens may have a rod-type structure.

The gas sensitive material layer may include a chalcogenide formed by a galvanic replacement reaction, a topotactic reaction, and a cation exchange reaction of the first and second internal electrodes $120a$ and $122a$ exposed on the sensing surface 140. The chalcogenide may include at least one chalcogen compound selected from among metal telluride, metal selenide, and metal sulfide. The chalcogenide may have a rod-type structure.

Hereinafter, a method of manufacturing a multi-layer ceramic/metal gas sensor according to an embodiment of the present invention will be described in more detail.

A multi-layer ceramic/metal platform to which an MLCP is applied may be used in order to manufacture a gas sensor.

FIG. 1 is a view showing internal and external structures of a multi-layer ceramic/metal platform to which an MLCP according to an embodiment is applied. In the multi-layer ceramic/metal platform to which an MLCP is applied, a plurality of sequential layer structures of a ceramic dielectric and a metal are layered, and the metal used as internal electrodes 120 and 122 is electrically connected to electrode terminals 130 and 132 formed at both ends of the multi-layer ceramic/metal platform. The multi-layer ceramic/metal platform includes at least one layered body in which a ceramic dielectric 110, a first internal electrode 120, a ceramic dielectric 110, and a second internal electrode 122 are sequentially layered. The first internal electrodes 120 are electrically connected to a first electrode terminal 132 provided on a first side surface, and the second internal electrodes 122 are electrically connected to a second electrode terminal 132 provided on a second side surface facing the first side surface.

The layered structure of the multi-layer ceramic/metal platform may be obtained by applying various thick film manufacturing process techniques, for example, a wet process such as tape casting, screen printing, hybrid sol-gel coating, and the like, or may be obtained by applying a dry process, such as thermal spray, cold spray, aerosol deposition, or the like.

Alumina ($Al_2O_3$), magnesia (MgO), silica ($SiO_2$), zirconia ($ZrO_2$), barium titanate ($BaTiO_3$), or the like, having excellent electrical insulation, corrosion resistance, and abrasion resistance, may be used as a ceramic material for forming the ceramic dielectric 110.

A metal, such as gold (Au), silver (Ag), zinc (Zn), nickel (Ni), copper (Cu), titanium (Ti), chromium (Cr), manganese (Mn), iron (Fe), cobalt (Co), aluminum (Al), platinum (Pt), palladium (Pd), iridium (Ir), magnesium (Mg), cobalt (Co), or the like, having excellent electric conductivity, may be used as a metal material for forming the first and second internal electrodes 120 and 122.

As an example for manufacturing the multi-layer ceramic/metal platform, screen printing is a method of printing a metal ink (or a metal paste) in which a metal powder and a solvent are mixed on a ceramic sheet, and performing heat treatment. For example, a ceramic powder slurry in which a binder and a solvent are mixed is heated on a conveyor belt to form a ceramic sheet in a sheet form, a metal ink (or a metal paste) in which a metal powder and a solvent for forming an internal electrode are mixed is screen-printed on an upper end of the ceramic sheet, a plurality of sheets on which the metal ink is screen-printed are layered and heat-treated or sheets on which the metal ink is screen-printed are heat-treated and layered in plurality, electrode terminals are formed of a metal or the like, and thus the multi-layer ceramic/metal platform may be manufactured. Since the screen printing method is generally well known, a detailed description thereof will be omitted here. The heat treatment is preferably performed at a temperature of about 300 to 600° C.

Since the ceramic dielectric 110 (a ceramic layer) is positioned between the first and second internal electrodes 120 and 122 made of a metal, the internal electrodes 120 and 122 between the layers are spaced apart from each other and are not connected to each other. Further, the internal electrodes 120 and 122 are embedded into the multi-layer ceramic/metal platform, and the internal electrodes 120 and 122 except for portions in contact with the electrode terminals 130 and 132 are not exposed to the outside. The internal electrodes 120 and 122 are electrically connected to the electrode terminals 130 and 132 provided on the side surfaces of the multi-layer ceramic/metal platform. In the multi-layer ceramic/metal platform manufacturing process, gas sensing properties are changed by adjusting a material constituting a metal and ceramic, or a width and a length of the internal electrode are easily adjusted by adjusting a ceramic/metal layering condition. Since an MLCP is applied, the manufacturing process may be simple and a manufacturing cost may be reduced.

The multi-layer ceramic/metal platform to which the above-described MLCP is applied is cut to a desired size in a layered direction (a direction perpendicular to the layered surface) to form a sensor body of the gas sensor. For example, the sensor body as shown in FIG. 2 may be formed by cutting the multi-layer ceramic/metal platform shown in FIG. 1 along lines I-I' and II-II'. The sensor body may be formed by cutting the multi-layer ceramic/metal platform shown in FIG. 1 along only line I-I', or by cutting the multi-layer ceramic/metal platform shown in FIG. 1 along only line II-II'.

The multi-layer ceramic/metal platform is cut so that the internal electrodes are exposed on at least one side surface except the side surfaces on which the electrode terminals are provided. The multi-layer ceramic/metal platform is preferably cut so that the internal electrodes 120a and 122a are exposed on at least one side surface of the sensor body, and thus the internal electrodes 120a and 122a are exposed through the cut surface. In FIG. 2, a surface on which the internal electrodes 120a and 122a are exposed is the cut surface, and a state in which the internal electrodes 120a and 122a are exposed through the cut surface is shown. The first internal electrode 120a and the second internal electrode 122a are exposed through the cut surface by the cutting, and the first internal electrode 120a and the second internal electrode 122a are exposed to at least one side surface except the side surfaces of the sensor body on which the first electrode terminal 130a and the second electrode terminal 132a are provided, so that the sensing surface 140 is formed.

The sensor body of the gas sensor has a structure in which a plurality of sequentially layered structures of a ceramic dielectric and a metal are layered, and the metal used as the internal electrodes are electrically connected to the electrode terminals 130a and 130b formed at both ends of the multi-layer ceramic/metal platform.

The sensor body includes at least one layered body in which the ceramic dielectric 110a, the first internal electrode 120a, the ceramic dielectric 110a, and the second internal electrode 122a are sequentially layered. The ceramic dielectric 110a may include at least one ceramic selected from among alumina ($Al_2O_3$), magnesia (MgO), silica ($SiO_2$), zirconia ($ZrO_2$), and barium titanate ($BaTiO_3$). The first and second internal electrodes 120a and 122a may be made of a metal such as gold (Au), silver (Ag), zinc (Zn), nickel (Ni), copper (Cu), titanium (Ti), chromium (Cr), manganese (Mn), iron (Fe), cobalt (Co), aluminum (Al), platinum (Pt), palladium (Pd), iridium (Ir), magnesium (Mg), cobalt (Co), or the like. The sensor body may have a hexahedral shape, and preferably has a structure in which a lowermost layer and an uppermost layer are made of the ceramic dielectric 110a. Since the ceramic dielectric 110a (the ceramic layer) is positioned between the internal electrodes 120a and 122a made of a metal, the internal electrodes 120a and 122a between the layers are spaced apart from each other and are not connected to each other. Further, since the internal electrodes 120a and 122a are separated from each other by the ceramic dielectric 110a inside the sensor body, an electrode short circuit may be prevented and reliability may be improved. In the multi-layer ceramic/metal platform manufacturing process, gas sensing properties may be changed by adjusting a material constituting a metal and ceramic, or a width and a length of the internal electrode may be adjusted by adjusting a ceramic/metal layering condition, and an interval between the internal electrodes may also be adjusted.

The first internal electrode 120a is electrically connected to the first electrode terminal 130a (or the first external electrode) provided on the first side surface of the sensor body, and the second internal electrode 122a is electrically connected to the second electrode terminal 132a (or the second external electrode) provided on the second side surface of the sensor body facing the first side surface.

The first internal electrode 120a and the second internal electrode 122a are exposed to at least one side surface except the side surfaces of the sensor body on which the first electrode terminal 130a and the second electrode terminal 132a are provided, to form the sensing surface 140.

Since the multi-layer ceramic/metal platform to which an MLCP is applied may be simply cut and may be used as the sensor body, the manufacturing process may be simple and a manufacturing cost may be significantly reduced.

The metal films 150 are formed by applying or depositing a gas sensitive material for gas detection on a part or whole of the sensing surface 140 or by applying or depositing a conductive metal having a lower contact resistance with a gas sensitive material layer than the first and second internal electrodes 120a and 122a on the exposed first and second internal electrodes 120a and 122a, and a gas sensitive material for gas detection is applied or deposited on a part or whole of the sensing surface 140 on which the metal films 150 are formed.

Various types of gas sensitive materials which will be described in Examples 1 to 4 are applied to the surfaces on which the internal electrodes 120a and 122a are exposed, according to a gas to be sensed. Various types of gas sensitive materials and deposition processes may be applied to such a gas sensor according to a target gas.

Since the gas sensing is a surface reaction, the sensor body is introduced to increase a reaction area, a gas sensitive material layer is formed of a metal (or the metal alloy), an oxide semiconductor, CNTs, chalcogens, a chalcogenide, and the like, capable of sensing a gas, characteristics of the gas sensor, such as sensitivity, selectivity, response time, reliability, and the like, may be improved, and multiple functions may be applied so that application fields may be expanded.

A change of an electrical signal of the gas sensitive material due to gas contact may be effectively transmitted to the internal electrodes 120a and 122a and the electrode terminals 130a and 132a.

Example 1

In order to improve gas sensitivity, the metal films 150 are formed of a conductive metal having a lower contact resistance with a gas sensitive material layer than the internal electrodes 120a and 122a on the internal electrodes 120a and 122a exposed through the sensing surface 140 of the sensor body.

When a gas sensitive material layer is formed of an oxide semiconductor, CNTs, chalcogens, a chalcogenide, or the like on the internal electrodes 120a and 122a, a metal having a low contact resistance with each gas sensitive material layer may be selected.

For example, nickel (Ni), which forms the internal electrodes 120a and 122a, is gradually oxidized at room temperature to change electrical properties thereof, and specifically, when the gas sensor is driven at a high temperature, electrode characteristics thereof may be significantly degraded. Therefore, a conductive metal having a low contact resistance with a gas sensitive material layer is plated (or deposited) on the internal electrodes 120a and 122a. When a conductive metal having a lower contact resistance with a gas sensitive material layer than the internal electrodes 120a and 122a is plated (or deposited) on the internal electrodes 120a and 122a, gas sensitivity may be improved and reliability may be ensured due to prevention of oxidation of the electrodes. The gas sensitivity may be further improved by changing plating conditions. The conductive metal material having a lower contact resistance with a gas sensitive material layer than the internal electrodes 120a and 122a may include gold (Au), silver (Ag), zinc (Zn), copper (Cu), titanium (Ti), chromium (Cr), manganese (Mn), iron (Fe), cobalt (Co), aluminum (Al), platinum (Pt), palladium (Pd), iridium (Ir), magnesium (Mg), cobalt (Co), and the like, and such conductive metals may be formed by electroless deposition or electrodeposition.

A method of forming gold (Au), which is a conductive metal having a lower contact resistance with the gas sensitive material layer than the internal electrodes 120a and 122a, will be described as an example. A gold plating solution is prepared by adding a solvent (e.g., MIKO-2 (YMT Co.)) for gold plating and a potassium gold cyanide, which is a gold precursor, to distilled water, the sensor body in which the internal electrodes 120a and 122a are exposed through the sensing surface 140 thereof is impregnated with an HCl solution, a natural oxide layer on the upper portions of the internal electrodes 120a and 122a is etched, impurities are removed, and the sensor body is then cleaned with distilled water, and the cleaned sensor body is impregnated with the gold plating solution at a predetermined temperature (e.g., a range of 80 to 90° C.) to perform electroless deposition thereon, is cleaned with distilled water, and dried.

The conductive metal having a lower contact resistance with the gas sensitive material layer than the internal electrodes 120a and 122a may be applied on the internal electrodes 120a and 122a. FIG. 3 is a view showing a state in which the metal films 150 having a low contact resistance with a gas sensitive material layer are formed by performing gold plating on the internal electrodes 120a and 122a exposed through the sensing surface 140 in order to improve gas sensitivity.

Example 2

A thin film type or thick film type gas sensor may be prepared by depositing (or applying) a metal or an oxide semiconductor, capable of sensing a gas, as a gas sensitive material on a part or whole of the sensing surface 140 on which the metal films 150 are exposed. The thin film type or thick film type gas sensor has advantages in that manufacturing is simpler and sensitivity is more excellent as compared to a bulk type gas sensor.

Figure 8:
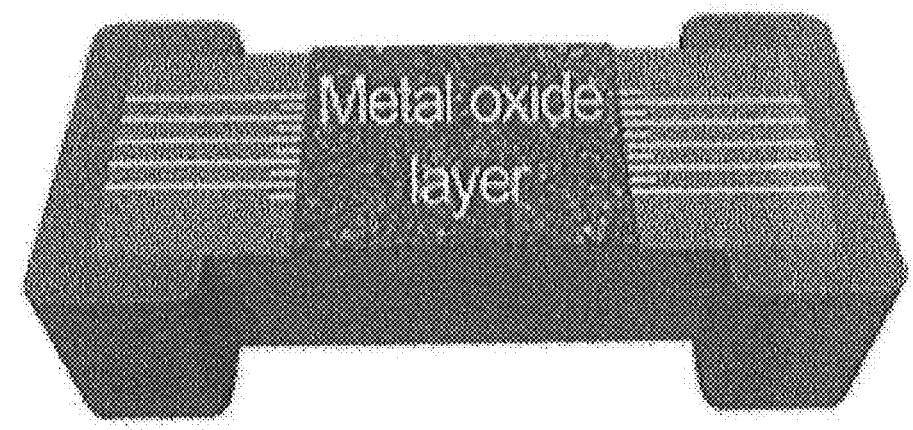
FIG. 8 is a view showing a state in which a metal oxide film is deposited as a gas sensitive material on a sensing surface on which metal films are exposed to form an oxide semiconductor gas sensor.

As an example of the thin film type or thick film type gas sensor, an oxide semiconductor gas sensor may be formed by depositing (or applying) an oxide semiconductor as a gas sensitive material on a part or whole of the sensing surface 140 (see FIG. 3) on which the metal films 150 are exposed. FIG. 8 shows a state in which an oxide semiconductor gas sensor is formed by depositing a metal oxide film as a gas sensitive material on the sensing surface 140 (see FIG. 3) on which the metal films 150 are exposed.

Referring to FIG. 8, a gas sensitive material of the gas sensor may be applied to a part or whole of the sensing surface 140 on which the metal films 150 are exposed. FIG. 8 is a view showing a state in which a gas sensitive material is applied to a part of the sensing surface 140 on which the metal films 150 are exposed.

In an oxide semiconductor gas sensor among gas sensors, gas sensitivity is represented as a change of an electrical signal (resistance or electric conductivity) of a material due to contact with reducing gases, such as CO, H, $C_3H_8$, $C_2H_5OH$, $CH_4$, $H_2S$, and the like, and oxidizing gases, such as NO, $NO_2$, $O_3$, and the like.

Ceramics having high reliability at a high temperature and high reliability in a reactive and corrosive atmosphere may be used as a gas sensitive material of the oxide semiconductor gas sensor. For example, the gas sensitive material may include tin oxide ($SnO_2$), titanium oxide ($TiO_2$), zinc oxide (ZnO), tungsten oxide ($WO_3$), cadmium oxide (CdO), iron oxide ($Fe_2O_3$), indium oxide ($In_2O_3$), or a mixture thereof, which is an N-type semiconductor. Further, the gas sensitive material may include nickel oxide (NiO), copper oxide (CuO), chromium oxide ($Cr_2O_3$), cobalt oxide ($Co_3O_4$), or a mixture thereof, which is a P-type semiconductor.

An oxide semiconductor thin film may be formed by depositing using SPD or the like on a part or whole of the sensing surface 140 (see FIG. 3) on which the metal films 150 are exposed.

For example, an oxide semiconductor thin film may be formed by the following SPD. An electrode terminal or the like, which is a region except a region to be deposited, is covered with a mask such as a cover glass or the like, a jig to which the sensor body is fixed is mounted on a rotation susceptor inside a chamber and then preheated while rotating the jig, a spray solution in which a metal precursor and a solvent are mixed is made into a droplet (mist) form using an ultrasonic transducer, and the droplet is introduced into the chamber using air or the like as a carrier gas. A spraying time is preferably about 1 to 60 minutes, and a process temperature is preferably about 250 to 400° C.

The gas sensitive material is a material capable of sensing harmful gases, such as hydrogen ($H_2$), hydrogen sulfide ($H_2S$), carbon monoxide (CO), carbon dioxide ($CO_2$), nitrogen dioxide ($NO_2$), ammonia ($NH_3$), and the like, or odor containing air.

Example 3

A CNT gas sensor may be formed by depositing (applying) CNTs as a gas sensitive material on a part or whole of the sensing surface 140 (see FIG. 3) on which the metal films 150 are exposed.

The CNTs have a small diameter and a large specific surface area, are susceptible to changes in current flow with only a small amount of gas adsorption, and have good mechanical properties and excellent electrical properties.

Single-wall carbon nanotubes (SWNTs) or multi-wall carbon nanotubes (MWNTs) may be used as the CNTs. However, the SWNTs are preferably used as the CNTs in consideration of sensitivity of the sensor or the like. The CNTs may be synthesized by a method such as chemical vapor deposition (CVD) or the like. Since a method of synthesizing CNTs is already known, a detailed description thereof will be omitted here. The CNTs used in the CNT gas sensor preferably have a diameter of about 1 to 20 nm and a length of about 1 to 50 μm.

A suspension in which CNTs are dispersed may be prepared, and the CNT suspension may be deposited (or applied) on a part or whole of the sensing surface 140 (see FIG. 3) on which the metal films 150 are exposed to prepare the CNT sensor.

FIG. 23 is a view for describing a method of manufacturing a suspension in which SWNTs are dispersed.

Referring to FIG. 23, CNTs are placed in a beaker containing an acid solution, and are subjected to acid treatment while the beaker is stirred in a sealed state. The acid treatment is preferably performed at a temperature of about 40 to 90° C. for about 10 minutes to 72 hours. The acid solution may be a sulfuric acid ($H_2SO_4$) solution, a nitric acid ($HNO_3$) solution, or a mixed solution thereof. The stirring is preferably performed at a rotation speed of about 5 to 100 rpm.

The stirred results are filtered using a filter paper (e.g., a cellulose filter paper), the filtered results are cleaned with distilled water or the like, and the CNTs collected on the filter paper are cleaned with acetone or the like to remove impurities, and are dried. The drying is preferably performed in a vacuum oven. Further, the drying is preferably performed at a temperature of about 40 to 90° C. for about 10 minutes to 72 hours.

The dried CNTs are immersed in a solvent (e.g., distilled water), and are subjected to sonification by applying ultrasonic vibration using a horn. The sonification is preferably performed at a power of about 10 to 200 W for about 1 minute to 24 hours.

The sonification results are centrifuged to obtain a supernatant from which a large amount of residual bundles are removed, and the supernatant is filtered using a filter paper to form a CNT suspension in which CNTs are dispersed. The centrifugation is preferably performed at a rotation speed of about 8,000 to 20,000 rpm.

The CNTs may be coated with a catalyst for improving gas sensitivity. In order to overcome a disadvantage of low selectivity of the CNT gas sensor and to improve sensitivity, the CNTs may be coated (borne) with the catalyst to effectively detect gases, such as $H_2$, $CH_4$, $H_2S$, CO, $NO_x$, and the like. FIG. 24 is a view showing a process of forming a platinum catalyst, as an example of a catalyst, on CNTs.

Referring to FIG. 24, a precursor of the catalyst may be formed on walls of the CNTs, and hydrogen plasma processing (hydrogen plasma dry etching) may be performed to reduce the precursor of the catalyst formed on the walls of the CNTs.

In order to coat (bear) the catalyst on the CNTs, the precursor of the catalyst is dispersed in the CNT suspension. The catalyst may include at least one metal selected from among platinum (Pt), palladium (Pd), gold (Au), silver (Ag), iridium (Ir), rhodium (Rh), and ruthenium (Ru). When the catalyst is platinum (Pt), the precursor of the catalyst may be a chloroplatinic acid solution (an $H_2PtCl_6$ aqueous solution) or the like, and when the catalyst is palladium (Pd), the precursor of the catalyst may be a palladium chloride solution (an $H_2PdCl_6$ aqueous solution) or the like.

The CNT suspension (the CNT suspension containing the precursor of the catalyst) is applied on a part or whole of the sensing surface 140 on which the metal films 150 are exposed, and dried, and hydrogen plasma processing (hydrogen plasma dry etching) is then performed. In order to perform the hydrogen plasma processing, the CNTs (the CNTs containing the precursor of the catalyst) applied on a part or whole of the sensing surface 140 (see FIG. 3) on which the metal films 150 are exposed are introduced into a reaction chamber, hydrogen ($H_2$) is supplied into the reaction chamber, and plasma is ignited. The hydrogen plasma processing (the hydrogen plasma dry etching) is preferably performed by applying a power of 20 to 95 W, and an application time of the power is preferably about 10 to 300 seconds. When a power higher than 95 W is applied, the shape of the CNTs may be damaged, and may have a shape like particles other than the unique shape of the CNTs. The precursor of the catalyst formed on the walls of the CNTs is reduced by the hydrogen plasma processing (the hydrogen plasma dry etching). As described above, the CNT gas sensor containing the catalyst has an advantage in that gas sensitivity with respect to ammonia ($NH_3$) gas, hydrogen ($H_2$) gas, and the like is increased.

The CNTs may be arranged by dielectrophoresis (DEP). The suspension of the CNTs is applied on a part or whole of the sensing surface 140 on which the metal films 150 are exposed, and the CNTs are arranged so as to cross an arrangement of the metal films 150 by applying an alternating electric field, and dried, to obtain the CNTs arranged so as to cross the arrangement of the metal films 150. The alternating electric field is preferably applied at a frequency of about 60 kHz to 20 MHz, and an application time of the alternating electric field preferably ranges from about 10 to 300 seconds. When a frequency of less than 60 kHz is applied, the CNTs may be randomly located regardless of an electrode arrangement direction. When a frequency of about 60 kHz to 20 MHz is applied, the CNTs cross the metal films 150 and are uniformly arranged. The results to which the alternating electric field is applied are cleaned with distilled water or the like, and then dried. The drying is preferably performed at a temperature of about 40 to 90° C. for about 10 minutes to 72 hours.

The CNTs coated with the catalyst may also be arranged so as to cross the arrangement of the metal films 150 by DEP. To this end, a CNT suspension (a dispersion) in which a precursor of a catalyst is dispersed is dropped on a part or whole of the sensing surface 140 (see FIG. 3) on which the metal films 150 are exposed, using a micropipette or the like, and an alternating electric field of a constant frequency is applied to the CNT suspension. The alternating electric field is preferably applied at a frequency of about 60 kHz to 20 MHz, and an application time of the alternating electric field preferably ranges from about 10 to 300 seconds. When a frequency of less than 60 kHz is applied, the CNTs may be randomly located regardless of an electrode arrangement direction. When a frequency of about 60 kHz to 20 MHz is applied, the CNTs cross the metal films 150 and are uniformly arranged. The results to which the alternating electric field is applied are cleaned with distilled water or the like, and then dried. The drying is preferably performed at a temperature of about 40 to 90° C. for about 10 minutes to 72 hours. The CNTs containing the precursor of the catalyst are arranged by such a DEP on the sensing surface 140 (see FIG. 3) on which the metal films 150 are exposed. Hydrogen plasma processing (hydrogen plasma dry etching) is performed on the CNTs (the CNTs containing the precursor of the catalyst) arranged on the sensing surface 140 (see FIG. 3) on which the metal films 150 are exposed. In order to perform the hydrogen plasma processing, Hydrogen ($H_2$) is supplied into the reaction chamber into which the CNTs (the CNTs containing the precursor of the catalyst) arranged on the sensing surface 140 (see FIG. 3) on which the metal films 150 are exposed are introduced, and plasma is ignited. The hydrogen plasma processing (the hydrogen plasma dry etching) is preferably performed by applying a power of 20 to 95 W, and an application time is about 10 to 300 seconds. When a power higher than 95 W is applied, the shape of the CNTs may be damaged, and may have a shape like particles other than the unique shape of the CNTs. The precursor of the catalyst formed on the walls of the CNTs is reduced by the hydrogen plasma processing (the hydrogen plasma dry etching). As described above, the CNT gas sensor containing the catalyst has an advantage in that gas sensitivity with respect to ammonia ($NH_3$) gas, hydrogen ($H_2$) gas, and the like is increased.

Example 4

Galvanic replacement may be performed on the internal electrodes 120a and 122a (see FIG. 2) exposed through the sensing surface 140, and the internal electrodes 120a and 122a may be formed in a rod shape using a gas sensitive material to prepare a rod-type gas sensor.

A galvanic replacement reaction, which is a type of electroless deposition, is a technique of plating a metal by a redox potential without a reducing agent.

Hereinafter, an example of the galvanic replacement reaction will be described. The internal electrodes 120a and 122a (see FIG. 2) exposed through the sensing surface 140 are replaced with chalcogens using the galvanic replacement reaction. The chalcogens are a material which can cause a galvanic reaction with the internal electrodes shown in FIG. 2. The chalcogens may include at least one material selected from among selenium (Se) and tellurium (Te) except oxygen (O), sulfur (S), and polonium (Po).

For example, an example in which nickel internal electrodes are replaced with tellurium (Te) will be described. Nickel having a relatively low standard electrode potential is oxidized and tellurium having a relatively high reduction potential is reduced as shown in the following Reaction Formulas 1 to 3.

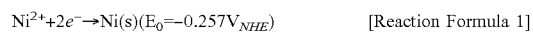
$Ni^{2+}+2e^-\rightarrow Ni(s)(E_0=-0.257V_{NHE})$ [Reaction Formula 1]

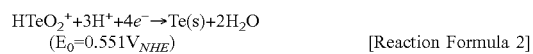
$HTeO_2^++3H^++4e^-\rightarrow Te(s)+2H_2O$
$(E_0=0.551V_{NHE})$ [Reaction Formula 2]

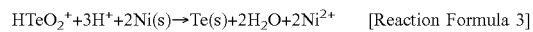
$HTeO_2^++3H^++2Ni(s)\rightarrow Te(s)+2H_2O+2Ni^{2+}$ [Reaction Formula 3]

A shape and crystallinity of the chalcogens deposited by the galvanic replacement reaction may be adjusted according to a concentration, a reaction temperature, a reaction time, a hydrogen ion concentration index (pH) of an electrolyte, and the like depending on chalcogens source and additives, and accordingly, gas sensitivity may be improved.

For the galvanic replacement reaction, the sensor body (see FIG. 2) including the internal electrodes 120a and 122a exposed through the sensing surface 140 is impregnated with an HCl solution or the like, a natural oxidation layer and impurities on the internal electrodes are removed, and the sensor body is cleaned with distilled water or the like.

A galvanic replacement solution containing chalcogen ions is prepared for galvanic replacement of the internal electrodes 120a and 122a. For example, a source (e.g., tellurium dioxide ($TeO_2$), which is a source of tellurium, etc.) of the chalcogens is added to an acid solution such as a nitric acid ($HNO_3$) solution, a hydrofluoric acid (HF) solution, or the like, or a base solution such as a sodium hydroxide (NaOH) solution or the like, and is stirred at a temperature of about 60 to 90° C. to prepare a galvanic replacement solution. In order to increase sensitivity and bonding force of a formed rod-type structure and to adjust a shape of the rod-type structure, an additive containing CTAB, POM, PVP, PDDA, SDS, or a mixture thereof may be further added to the galvanic replacement solution. The additive is preferably added to have a concentration of about 1 to 900 mM.

In order to deposit a gas sensitive material only on the internal electrodes 120a and 122a exposed through the sensing surface 140 of the sensor body, a region (a region including an electrode terminal) except a region to be deposited is electrically insulated, is impregnated with the galvanic replacement solution, and is coated with chalcogens. The galvanic replacement reaction is preferably performed for about 5 to 120 minutes. The formed structure is grown in the form of a rod having a hexahedral structure. As a galvanic replacement reaction time increases, a diameter of the formed rod-type structure increases. As a concentration of the additive increases, the diameter of the deposited rod-type structure decreases. The shape and diameter of the formed rod-type structure may be easily adjusted by appropriately adjusting the galvanic replacement reaction time, the concentration of the additive, and the like.

Various materials having a higher reduction potential than the internal electrode material (e.g., nickel) may be formed by utilizing the galvanic replacement reaction, and a chalcogenide may also be formed by a galvanic replacement reaction, a topotactic reaction, and a cation exchange reaction.

To this end, the first and second internal electrodes 120a and 122a exposed through the sensing surface 140 are converted into chalcogenides by a galvanic replacement reaction, a topotactic reaction, and a cation exchange reaction.

The chalcogenide is a binary or higher compound containing at least one chalcogen selected from among sulfur (S), selenium (Se), and tellurium (Te), and includes a chalcogen compound (a chalcogenide), such as metal telluride, metal sellenide, metal sulfide, or the like. More particularly, CdS, $Bi_2Se_3$, PbSe, CdSe, PbTeSe, $Bi_2Te_3$, $Sb_2Te_3$, PbTe, CdTe, ZnTe, $La_3Te_4$, $AgSbTe_2$, $Ag_2Te$, $AgPb_{18}BiTe_{20}$, $(GeTe)_x(AgSbTe_2)_{1-x}$ (x is a real number smaller than 1), $Ag_xPb_{18}SbTe_{20}$ (x is a real number smaller than 1), $Ag_xPb_{225}SbTe_{20}$ (x is a real number smaller than 1), $Sb_xTe_{20}$ (x is a real number smaller than 1), $Bi_xSb_2$, $Te_3$ (x is a real number smaller than 2), or a mixture thereof may be used as the chalcogenide. The chalcogens are formed by the above-described galvanic replacement reaction, and the chalcogens are converted into chalcogenides using chemical transformation, such as a topotactic reaction and a cation exchange reaction.

In order to form the chalcogenide, the sensor body in which the chalcogens are formed is immersed in a solution in which a material capable of causing a topotactic reaction with the chalcogens is dissolved and the chalcogens may be converted into a topotactic reaction product, and the sensor body in which the topotactic reaction product is formed is immersed in a solution in which a material capable of causing a cation exchange reaction with the topotactic reaction product is dissolved and the chalcogens may be converted into chalcogenides by a cation exchange reaction.

Hereinafter, a method of forming a chalcogenide will be described in more detail.

A solution in which a material capable of causing a topotactic reaction with chalcogens is dissolved is made, and the sensor body in which the chalcogens are formed is immersed to convert the chalcogens into a targeted topotactic reaction product. Any material capable of forming a compound with the chalcogens may be used as the material used for forming the topotactic reaction product, and the material may be in the form of a salt or an alkoxide. For example, the material capable of causing the topotactic reaction with the chalcogens may be a silver salt or a silver alkoxide, and may be, for example, silver nitrate ($AgNO_3$). Further, any solvent capable of dissolving the material capable of causing the topotactic reaction with the chalcogens may be used as the solvent used for forming the solution in which the material capable of causing the topotactic reaction with the chalcogens is dissolved.

A solution in which a material capable of causing a cation exchange reaction with the topotactic reaction product is dissolved is made, and the sensor body in which the topotactic reaction product is formed on the sensing surface 140 is immersed to convert the topotactic reaction product into a chalcogenide. Any material capable of forming the chalcogenide by causing a cation exchange reaction with the topotactic reaction product may be used as the material used for forming the chalcogenide, and the material may be in the form of a salt or an alkoxide. For example, the material capable of causing the cation exchange reaction with the topotactic reaction product may include at least one material selected from among a cadmium-based salt, a cadmium-based alkoxide, a zinc-based salt, a zinc-based alkoxide, a lead-based salt, a lead-based alkoxide, a copper-based salt, a copper-based alkoxide, a platinum-based salt, a platinum-based alkoxide, a palladium-based salt, a palladium-based alkoxide, a bismuth-based salt, a bismuth-based alkoxide, a tin-based salt, and a tin-based alkoxide. There may be cadmium nitrate ($Cd(NO_3)_2$) as a specific example of the material capable of causing the cation exchange reaction with the topotactic reaction product. Further, any solvent capable of dissolving the material capable of causing the cation exchange reaction with the topotactic reaction product may be used as the solvent used for forming the solution in which the material capable of causing the cation exchange reaction with the topotactic reaction product is dissolved.

More particularly, for example, the method of forming the chalcogenide will be described. A solution in which silver nitrate ($AgNO_3$) capable of causing a topotactic reaction with tellurium (Te), which is chalcogens, is dissolved may be made, the sensor body in which the chalcogens are formed may be immersed to convert the tellurium (Te) into silver telluride ($Ag_2Te$), which is a topotactic reaction product, the solution may be prepared by dissolving 0.1 g of silver nitrate ($AgNO_3$) in 5 ml of ethylene glycol, and the tellurium (Te) is chemically converted into silver telluride ($Ag_2Te$) by the topotactic reaction. The sensor body in which the silver telluride ($Ag_2Te$) is formed may be immersed in a solution in which cadmium nitrate ($Cd(NO_3)_2$) is dissolved, and reacted for 3 hours to form cadmium telluride (CdTe). To this end, a solution in which 0.056 M of cadmium nitrate ($Cd(NO_3)_2$) is dissolved in methanol may be used.

The chalcogenide may have a rod-type structure like the chalcogens.

The chalcogens or the chalcogenide have a higher reduction potential than the internal electrodes 120a and 122a.

Hereinafter, experimental examples of the present invention will be described in detail, and the present invention is not limited to the following experimental examples.

A multi-layer ceramic/metal platform in which ceramics and a metal were alternately layered, a metal was deposited on a pair of side walls facing each other, and electrode terminals were formed were made, the multi-layer ceramic/metal platform was cut in a direction perpendicular to a ceramic/metal layered surface to form a sensing surface, and the internal electrodes were exposed at a side surface except the side surfaces on which the electrode terminals were formed by the cutting.

A metal having a lower contact resistance with a gas sensitive material layer than the internal electrodes was plated by electrodeposition or electroless deposition to improve sensitivity, and a gas sensitive material such as an oxide semiconductor, CNTs, or the like was applied to evaluate gas sensing properties.

As another experimental example, a galvanic replacement reaction was caused to grow a gas sensitive material by immersing a sensing surface (a surface on which the internal electrodes are exposed) into a galvanic replacement solution, and the gas sensitive material was formed as a rod-type structure according to a reaction time, a concentration of an additive, or the like to evaluate gas sensitivity.

Experimental Example 1

In order to prepare a gas sensor, a multi-layer ceramic/metal platform to which an MLCP is applied was used.

The multi-layer ceramic/metal platform as shown in FIG. 1 was used. In the multi-layer ceramic/metal platform, a plurality of sequential layer structures of a ceramic dielectric and a metal were layered, and the metal used as internal electrodes was electrically connected to electrode terminals formed at both ends of the multi-layer ceramic/metal platform. In the multi-layer ceramic/metal platform used in the present experimental example, a size of the multi-layer ceramic/metal platform was $2.0 \times 1.2 \times 0.6$ mm$^3$, the ceramic dielectric (a ceramic layer) was made of barium titanate ($BaTiO_3$), the internal electrodes was made of nickel (Ni), and the nickel internal electrodes were connected to tin (Sn) electrode terminals. The nickel internal electrodes had a length of 1.7 mm and a thickness of 2 µm, and a pitch between the nickel internal electrodes was 14 µm.

Ni metals (the internal electrodes) were exposed by cutting and polishing the multi-layer ceramic/metal platform in a direction perpendicular to the ceramic/metal layered surface thereof to form the sensor body as shown in FIG. 2. Since the internal electrodes made of the Ni metals were spaced apart from each other and were not connected to each other with the ceramic dielectric (the ceramic layer) interposed therebetween and were separated from each other by the ceramic dielectric, reliability may be improved due to prevention of short-circuit of electrodes, and a structure in which the internal electrodes were electrically connected to the electrode terminals formed at both ends of the multi-layer ceramic/metal platform may be formed. The internal electrodes were cut so as to be exposed to at least one side surface except the side surfaces on which the electrode terminals were provided, and the internal electrodes were exposed through the cut surface. A first internal electrode and a second internal electrode were exposed through the cut surface by the cutting, and the first internal electrode and the second internal electrode were exposed to the side surface except the side surfaces of the sensor body in which a first electrode terminal and a second electrode terminal were provided so that a sensing surface was formed.

In order to improve gas sensitivity, gold (Au), which is a conductive metal, was plated on the internal electrodes exposed through the sensing surface to form metal films.

When a gas sensitive material layer was formed of an oxide semiconductor, CNTs, chalcogens, chalcogenide, or the like on the internal electrodes, a metal having a low contact resistance with each gas sensitive material layer may be selected.

There was a problem in that nickel (Ni) constituting the internal electrodes was gradually oxidized at room temperature and an electrical property thereof was changed, and particularly, an electrode property was significantly degraded when the gas sensor was driven at a high temperature. Therefore, gold (Au) having a lower contact resistance with a gas sensitive material layer than the nickel internal electrodes was plated (or deposited) on the internal electrodes exposed through the sensing surface. When gold (Au) is plated (or deposited) on the internal electrodes, sensitivity may be improved, reliability may be ensured due to prevention of short-circuit of the electrodes, and gas sensitivity may be further improved by changing plating conditions.

Gold (Au), which is a conductive metal, was formed by the following method. A gold plating solution was prepared by adding 5 ml of a solvent (MIKO-2 (YMT Co.)) for gold plating and 1 g of a potassium gold cyanide, which is a gold precursor, to distilled water. The sensor body (see FIG. 2) including the internal electrodes exposed through the sensing surface was immersed in a 3.5% HCl solution for 30 seconds, a natural oxide layer on the internal electrodes was etched, impurities were removed, and then the sensor body was cleaned with distilled water. The cleaned sensor body was immersed in the gold plating solution at temperatures of 70° C., 80° C., and 90° C. for 10 minutes, respectively, plated by electroless deposition, cleaned with distilled water, and dried.

Figure 4:
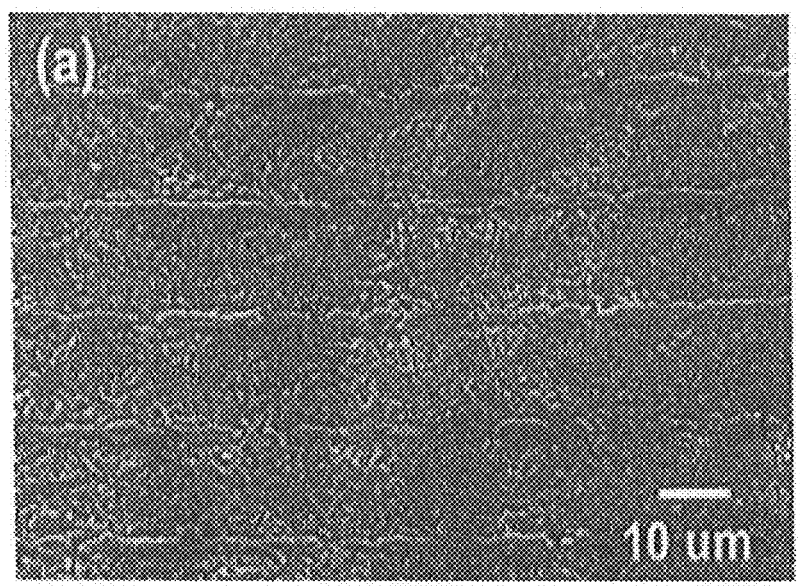
FIGS. 4 to 7 are scanning electron microscope (SEM) photographs showing cross sections of a sensor body in which gold (Au), which is a conductive metal, is formed on the internal electrodes of the gas sensor shown in FIG. 2.
Figure 5:
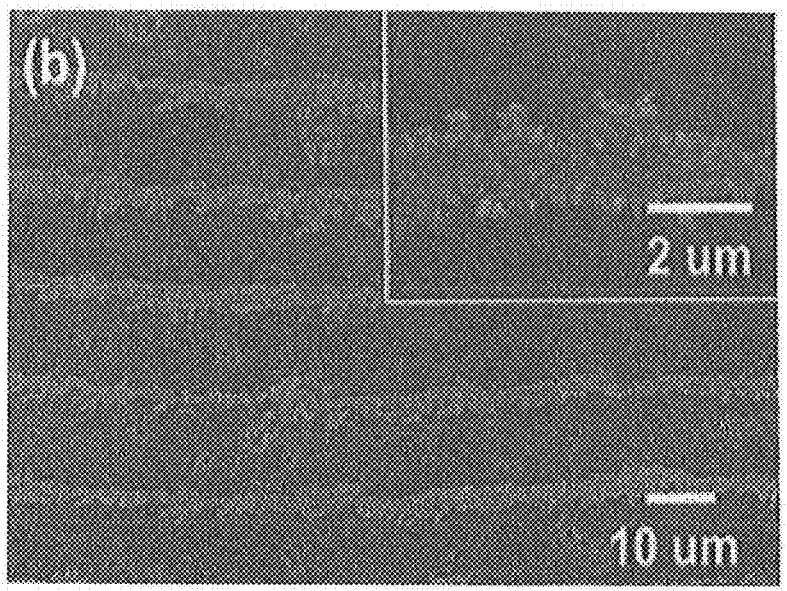
Figure 6:
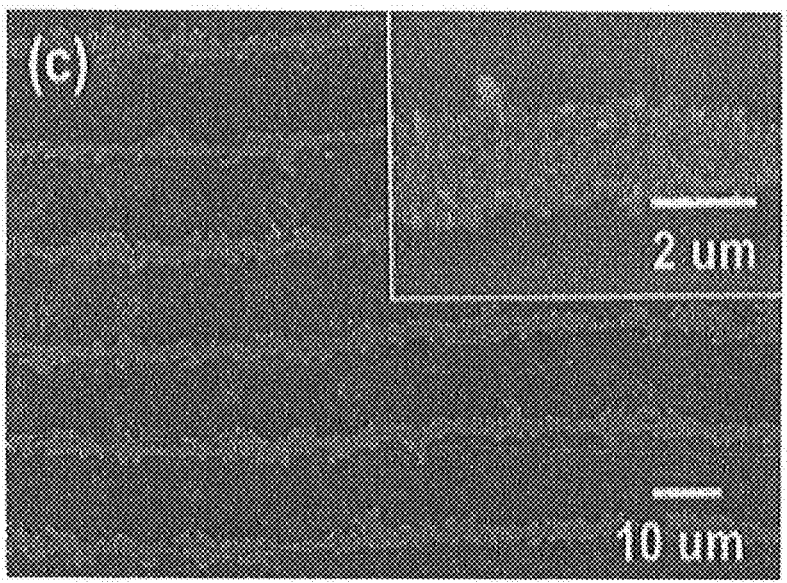
Figure 7:
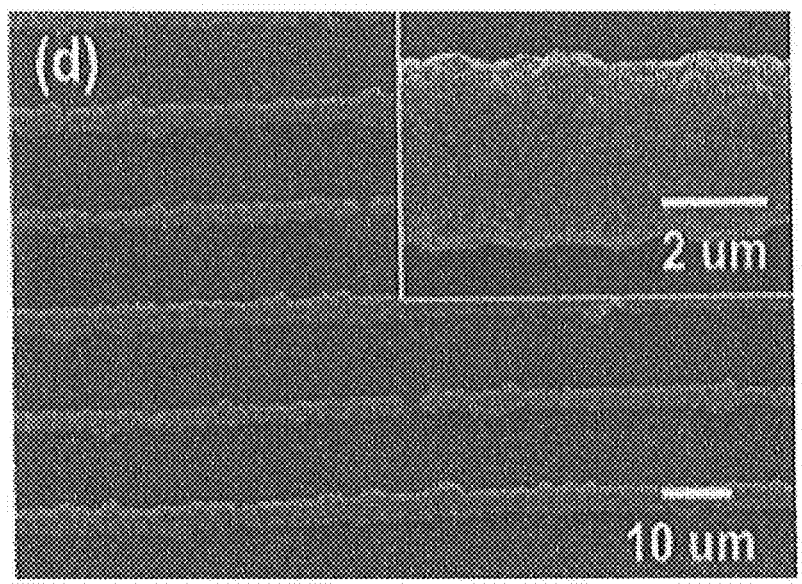

FIGS. 4 to 7 are scanning electron microscope (SEM) photographs showing cross sections of the sensor body in which gold (Au), which is a conductive metal, was formed on the internal electrodes of the gas sensor shown in FIG. 2. FIG. 4 shows a cross section of the sensor body before electroless deposition was performed, FIG. 5 shows a cross section of the sensor body when electroless deposition was performed at a temperature of 70° C., FIG. 6 shows a cross section of the sensor body when electroless deposition was performed at a temperature of 80° C., and FIG. 7 shows a cross section of the sensor body when electroless deposition was performed at a temperature of 90° C.

Referring to FIGS. 4 to 7, when electroless deposition was performed at a temperature lower than 80° C., particulate deposition materials were confirmed. However, it was confirmed that fine gold having a thickness of about 5 µm was deposited when electroless deposition was performed at a temperature of 90° C., and this condition was determined to be suitable for a forming condition of a metal film having a low contact resistance with a gas sensitive material layer.

Experimental Example 2

In the present experimental example, an oxide semiconductor gas sensor was prepared as an example of a thin film type or thick film type gas sensor. As a gas sensitive material, a tin oxide thin film, which is a ceramic having high reliability at a high temperature and in a reactive and corrosive atmosphere, was deposited.

As shown in FIG. 8, tin oxide ($SnO_2$) was deposited as a gas sensitive material on a part of the sensing surface (see FIG. 3) on which the metal films (the metal films formed by plating gold (Au) in Experimental Example 1) were exposed, to form a gas sensor.

A tin oxide ($SnO_2$) thin film was formed by depositing using SPD on a part of the sensing surface (see FIG. 3) on which the metal films were exposed.

The tin oxide ($SnO_2$) thin film was formed by the following method. An electrode terminal or the like, which is a region except a region to be deposited, was covered with a cover glass using a directly prepared jig, a jig to which the sensor body was fixed was mounted on a rotation susceptor inside a chamber and was then preheated while rotating the jig, a tin oxide ($SnO_2$) thin film was formed using SPD, and the experiment was performed by varying a process temperature and process time conditions in this case. A spray solution was prepared by adding 230.2 g of tin chloride pentahydrate ($SnCl_4.5H_2O$), which is a tin precursor, and 50 ml of ethanol into 950 ml of distilled water, was made into a droplet (mist) form using an ultrasonic transducer operating at a frequency of 1.6 MHz, and the droplet was introduced into the chamber at a flow rate of 1 L/min using air as a carrier gas.

Figure 9:
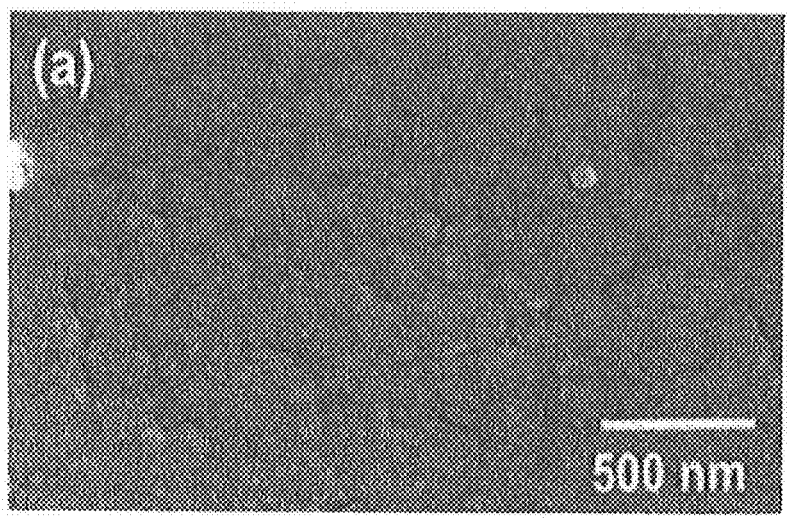
Figure 10:
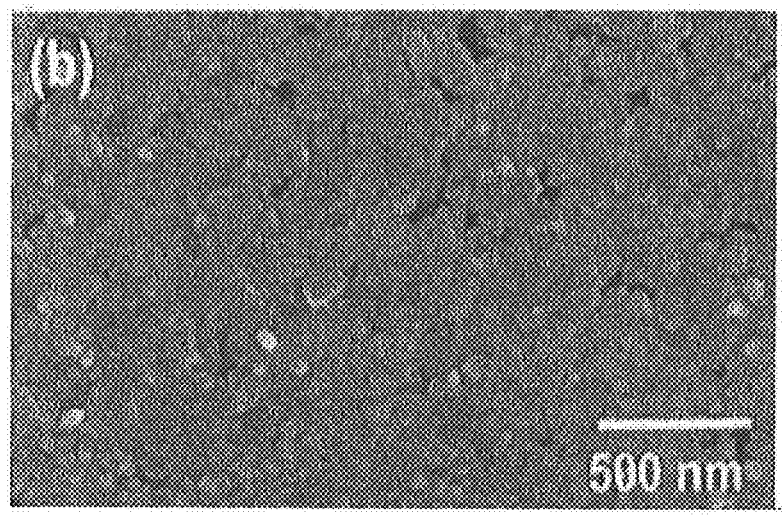
Figure 11:
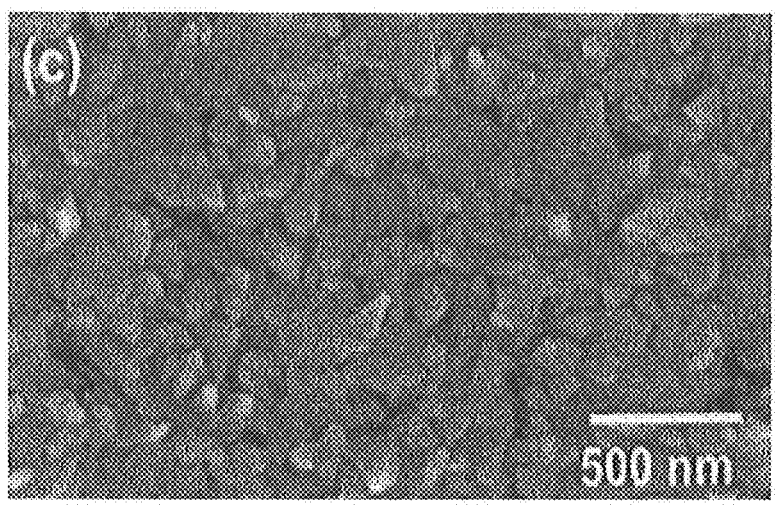
Figure 12:
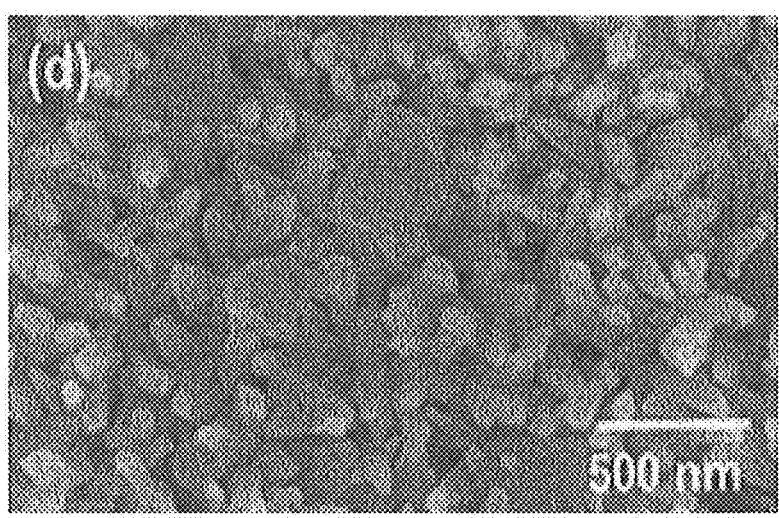
Figure 15:
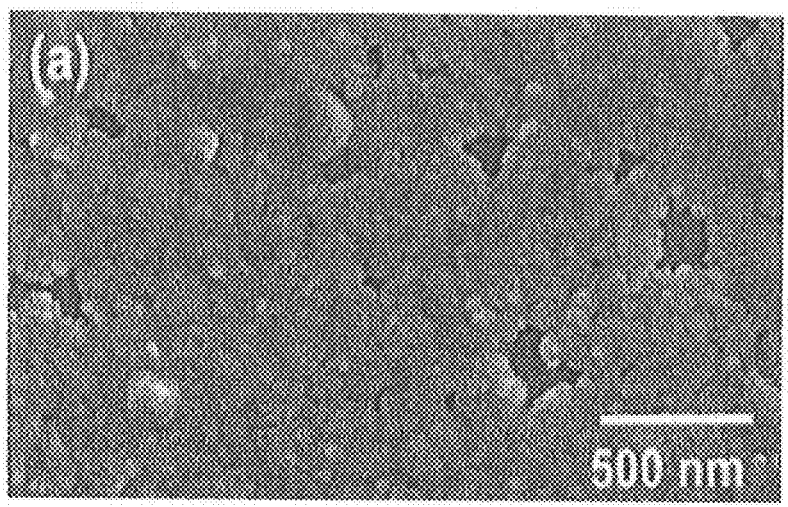
Figure 16:
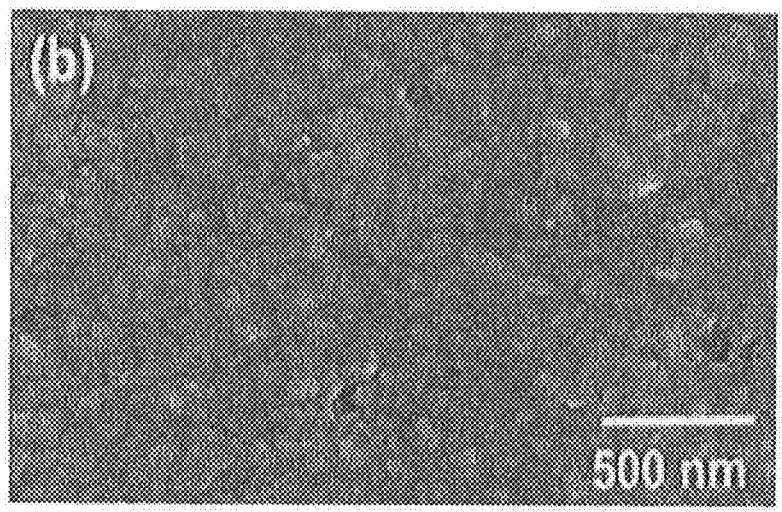
Figure 17:
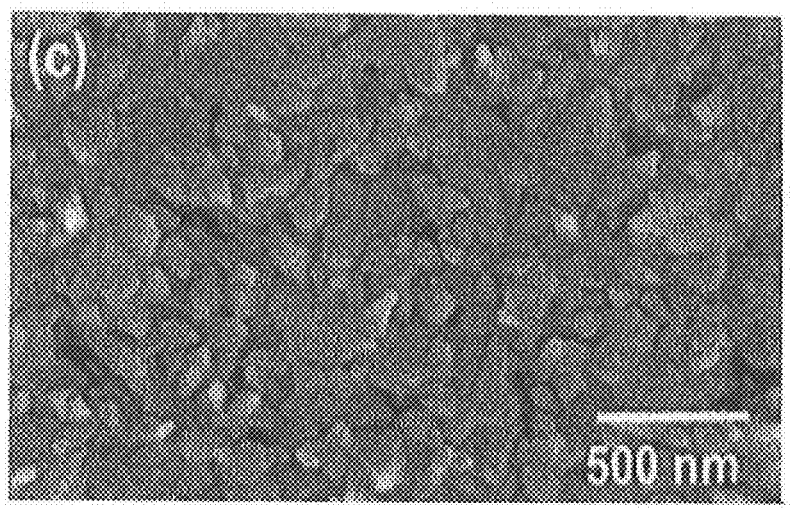
Figure 18:
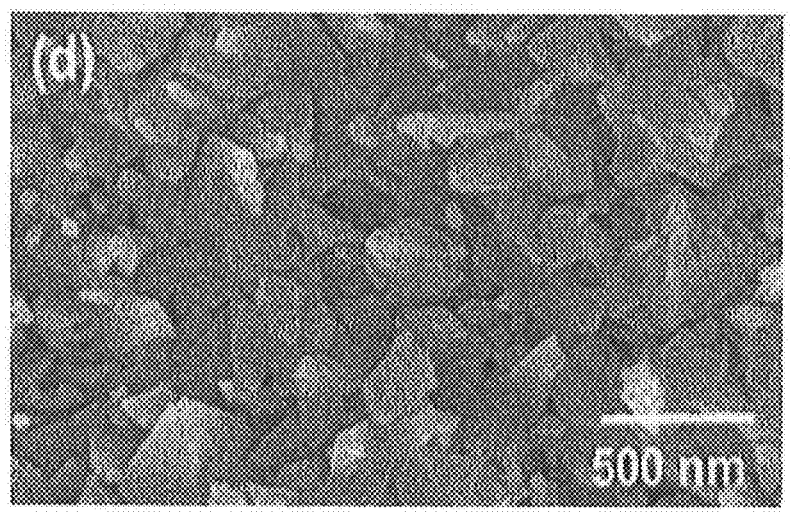

FIGS. 9 to 12 are SEM photographs of a tin oxide ($SnO_2$) thin film deposited by SPD. The tin oxide ($SnO_2$) thin film was deposited on the sensing surface (see FIG. 3) on which the metal films (the metal films formed by plating gold (Au) in Experimental Example 1) were exposed, for 30 minutes. FIG. 9 shows a case in which deposition was performed at a process temperature of 250° C., FIG. 10 shows a case in which deposition was performed at a process temperature of 300° C., FIG. 11 shows a case in which deposition was performed at a process temperature of 350° C., and FIG. 12 shows a case in which deposition was performed at a process temperature of 400° C.

Referring to FIGS. 9 to 12, when the deposition was performed at a process temperature of 250° C., a particle size was small. As a temperature was increased, a particle growth rate was increased, and thus the particle size was increased. When the deposition was performed at a process temperature of 400° C., a nanorod shape was obtained.

FIG. 13 is a graph showing X-ray diffraction (XRD) patterns of a tin oxide ($SnO_2$) thin film deposited by SPD. FIG. 13A shows an XRD pattern of a tin oxide ($SnO_2$) thin film formed on a glass substrate by SPD at a process temperature of 250° C., FIG. 13B shows an XRD pattern of a tin oxide ($SnO_2$) thin film formed on a glass substrate by SPD at a process temperature of 300° C., FIG. 13C shows an XRD pattern of a tin oxide ($SnO_2$) thin film formed on a glass substrate by SPD at a process temperature of 350° C., and FIG. 13D shows an XRD pattern of a tin oxide ($SnO_2$) thin film formed on a glass substrate by SPD at a process temperature of 400° C.

Referring to FIG. 13, it was confirmed that an amorphous phase was mainly formed at a process temperature of 300° C. or less, and a polycrystalline tin oxide corresponding to JCPDS No. 77-0452 was well deposited at a process temperature of 350° C. or more. A crystal growth direction was predominant in a (110) direction and contained (101), (200), (211), (220), and (310) crystalline peaks having small intensity.

FIG. 14 is a graph showing resistivity (see FIG. 14A), mobility (see FIG. 14B), and a carrier concentration (see FIG. 14C) of the tin oxide ($SnO_2$) thin film deposited by SPD under the process temperature conditions as described in FIG. 13.

Referring to FIG. 14, crystallinity of tin oxide affects electrical properties. The electrical properties were measured using a hall resistance measurement system. When the process temperature was increased from 250° C. and 300° C. to 350° C., the resistivity was decreased, and the mobility and the carrier concentration were increased, and when the process temperature was further increased to 400° C., the resistivity was increased, and the mobility and the carrier concentration were decreased. It is considered that, as the process temperature was increased from 250° C. and 300° C. to 350° C., the resistivity was decreased due to grain growth of the tin oxide thin film and an increase of crystallinity, the mobility was increased due to an increase of crystal grain size and suppression of scattering of carriers in grain boundaries, and the carrier concentration was increased due to predominant growth in a (110) direction with many oxygen defects. When the process temperature was further increased to 400° C., the nanorod shape confirmed in FIG. 12 was obtained, which appears to be caused by the increase of pores inside the thin film. Therefore, it is considered that a suitable process temperature for increasing gas sensitivity of tin oxide deposited by SPD is 350° C.

FIGS. 15 to 18 are SEM photographs of a tin oxide thin film deposited by SPD. The tin oxide thin film was deposited on the sensing surface (see FIG. 3) on which the metal films were exposed, at a temperature of 350° C. using the method described with reference to FIG. 8, and in this case, process times were 5 minutes (see FIG. 15), 10 minutes (see FIG. 16), 30 minutes (see FIG. 17), and 60 minutes (see FIG. 18).

Referring to FIGS. 15 to 18, it was confirmed that when a spray solution was brought into contact with a substrate heated to a temperature of 350° C., isolated tin oxide particles were formed, and grain growth occurred as a deposition time was increased.

FIG. 19 is a graph showing XRD patterns of a tin oxide thin film deposited by SPD. FIG. 19A shows an XRD pattern of a tin oxide ($SnO_2$) thin film deposited and formed by SPD for a process time of 5 minutes, FIG. 19B shows an XRD pattern of a tin oxide ($SnO_2$) thin film deposited and formed by SPD for a process time of 10 minutes, FIG. 19C shows an XRD pattern of a tin oxide ($SnO_2$) thin film deposited and formed by SPD for a process time of 30 minutes, and FIG. 19D shows an XRD pattern of a tin oxide ($SnO_2$) thin film deposited and formed by SPD for a process time of 60 minutes.

Referring to FIG. 19, it was confirmed that tin oxide was predominantly grown in a thermodynamically stable (110) direction, and polycrystalline was increased while the number of particles growing in (211) and (101) directions was increased as a deposition time was increased.

FIG. 20 is a graph showing resistivity (see FIG. 20A), mobility (see FIG. 20B), and a carrier concentration (see FIG. 20C) of a tin oxide thin film deposited by SPD.

Referring to FIG. 20, as a result of measuring mobility, resistivity, and a carrier concentration according to a deposition time using a hall measurement method, it was confirmed that a carrier scattering phenomenon of grain boundaries was suppressed as the deposition time was increased so that the resistivity was deceased and the mobility was increased, and the carrier concentration was decreased by decreasing percentages of the crystals grown in a (110) direction with many oxygen defects. Therefore, it is considered that the tin oxide grown in the (110) direction with a good electrical property is most suitable as a gas sensitive material.

FIGS. 21 and 22 are graphs showing hydrogen sulfide ($H_2S$) gas sensing properties of the deposited tin oxide thin film. A tin oxide thin film deposited at a temperature of 350° C. for 30 minutes on the sensing surface (see FIG. 3) on which the metal films were exposed using the method described with reference to FIG. 8 was used as a gas sensitive material, dry air was used as a reference gas, and the dry air was introduced into a hydrogen sulfide gas of 1 to 5 ppm. A resistance value ($R_f$) when exposed to the hydrogen sulfide gas at 250° C. and a resistance value ($R_0$) of the sensor in air were measured, and sensitivity was expressed as a resistance change amount $(R_f-R_0)/R_0$.

Referring to FIGS. 21 and 22, it was confirmed that a change of resistivity of tin oxide according to a concentration of hydrogen sulfide had a linear correlation (see FIG. 22), and the sensitivity (see FIG. 21) was indicated to 0.032 ppm$^{-1}$ at 1 ppm, which is a threshold limit value (TLV) of the hydrogen sulfide gas. The sensitivity may be improved by adding a noble metal or oxide catalyst, such as platinum (Pt), palladium (Pd), silver (Ag), ruthenium (Ru), nickel (Ni), cobalt (Co), lanthanum oxide ($La_2O_3$), copper oxide (CuO), titanium oxide ($TiO_2$), or the like, and it is considered that a detection limit at 250° C. was 1 ppm, which may be easily used as a next-generation gas sensor compared to a conventional tin oxide thin film gas sensor.

Experimental Example 3

A CNT gas sensor was prepared by depositing SWNTs as a gas sensitive material on the sensing surface (see FIG. 3) on which the metal films were exposed.

The CNTs had a small diameter and a large specific surface area, were susceptible to changes in current flow with only a small amount of gas adsorption, and had good mechanical properties and excellent electrical properties. In order to overcome the disadvantage of low selectivity of the CNT gas sensor and to improve sensitivity, various materials and catalysts may be added to easily detect gases such as $H_2$, $CH_4$, $H_2S$, CO, $NO_x$, and the like.

In the present experimental example, SWNTs (Nanostructured & Amorphous Materials, Inc.) synthesized by CVD were used, and the diameter and the length of the SWNTs were 1 to 2 nm and 5 to 20 μm, respectively.

A suspension in which the SWNTs are dispersed was prepared as shown in FIG. 23.

Referring to FIG. 23, 2 g of SWNTs were placed in a beaker containing 300 ml of sulfuric acid ($H_2SO_4$) and 200 ml of nitric acid ($HNO_3$) solution, and were subjected to acid treatment while the beaker is stirred in a sealed state. The stirred results were filtered using a cellulose filter paper, the filtered results were cleaned with distilled water until a pH reached 7, the SWNTs collected on the filter paper were cleaned with acetone to remove impurities, and were dried in a vacuum oven at 60° C. for 24 hours. 3 mg of dried SWNTs were immersed in 150 ml of distilled water, and were subjected to sonification by applying ultrasonic vibration at 80 W for 60 minutes using a horn, a supernatant from which a large amount of residual bundles had been removed was obtained by performing centrifugation at a speed of 14,000 rpm, and the supernatant was filtered using a filter paper to prepare a suspension (a CNT suspension) in which the SWNTs were dispersed.

A platinum catalyst was formed on the SWNTs as shown in FIG. 24.

Referring to FIG. 24, a precursor of the catalyst was formed on walls of the CNTs, the CNTs were arranged by DEP, and then hydrogen plasma processing (hydrogen plasma dry etching) was performed to reduce the precursor of the catalyst on the walls of the CNTs.

First, in order to add platinum (Pt) to the SWNTs, 5 μl of a chloroplatinic acid solution (a 8 wt % $H_2PtCl_6$ aqueous solution), which is a platinum precursor, was dispersed in 10 ml of CNT suspension, 0.5 μl of a dispersion in which the platinum precursor was dispersed was dropped to the sensing surface (see FIG. 3) on which the metal films were exposed, using a micropipette, 10 $V_{p-p}$ of an alternating electric field having a constant frequency was applied for 60 seconds, and the result was cleaned with distilled water, was dried in an oven at 60° C. for 60 minutes, and was subjected to the hydrogen plasma processing (the hydrogen plasma dry etching).

Figure 26:
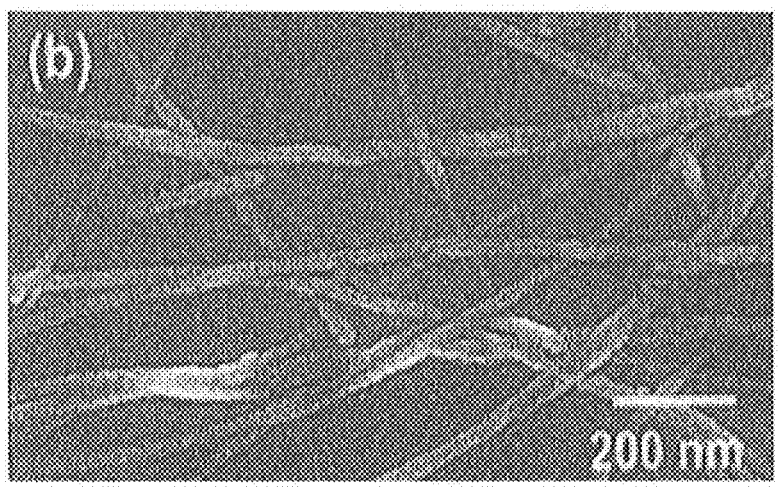
Figure 27:
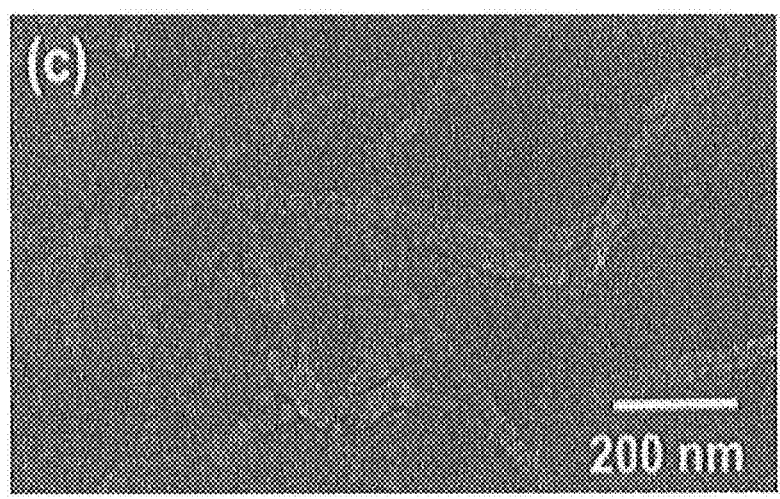
Figure 28:
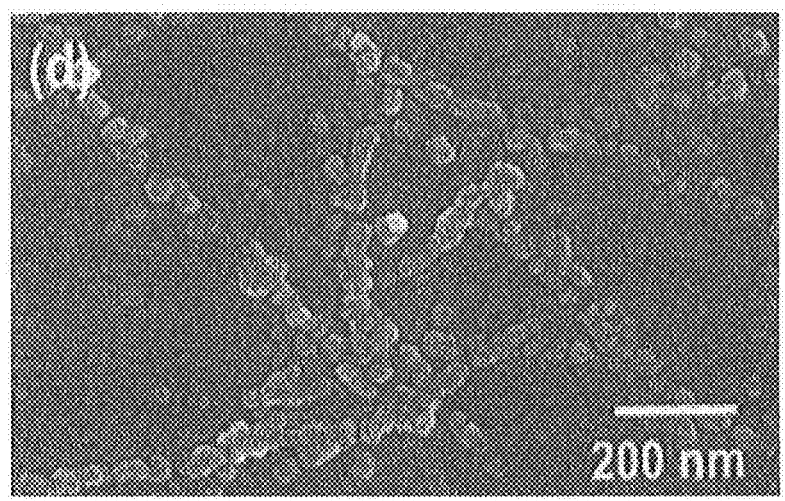

FIGS. 25 to 28 are SEM photographs of SWNTs having platinum catalyst particles formed by hydrogen plasma processing (hydrogen plasma dry etching) at different powers. FIG. 25 shows a result obtained by analyzing a sample before hydrogen plasma processing (hydrogen plasma dry etching), FIG. 26 shows a result obtained by analyzing a sample subjected to the hydrogen plasma processing at a power of 40 W, FIG. 27 shows a result obtained by analyzing a sample subjected to the hydrogen plasma processing at a power of 100 W, and FIG. 28 shows a result obtained by analyzing a sample subjected to the hydrogen plasma processing at a power of 200 W.

Referring to FIGS. 25 to 28, plasma was ignited at a pressure of 1,000 mTorr for 30 minutes in a reaction chamber to which hydrogen of 99.999% high purity was introduced. It was confirmed that when a power of 40 W was applied, the shape of the CNTs before the hydrogen plasma processing was maintained, but when a power of 100 W or more was applied, the shape of the CNTs was seriously damaged and had a shape like particles. Therefore, it was determined to be suitable to apply a power of 40 W lower than 100 W.

Figure 29:
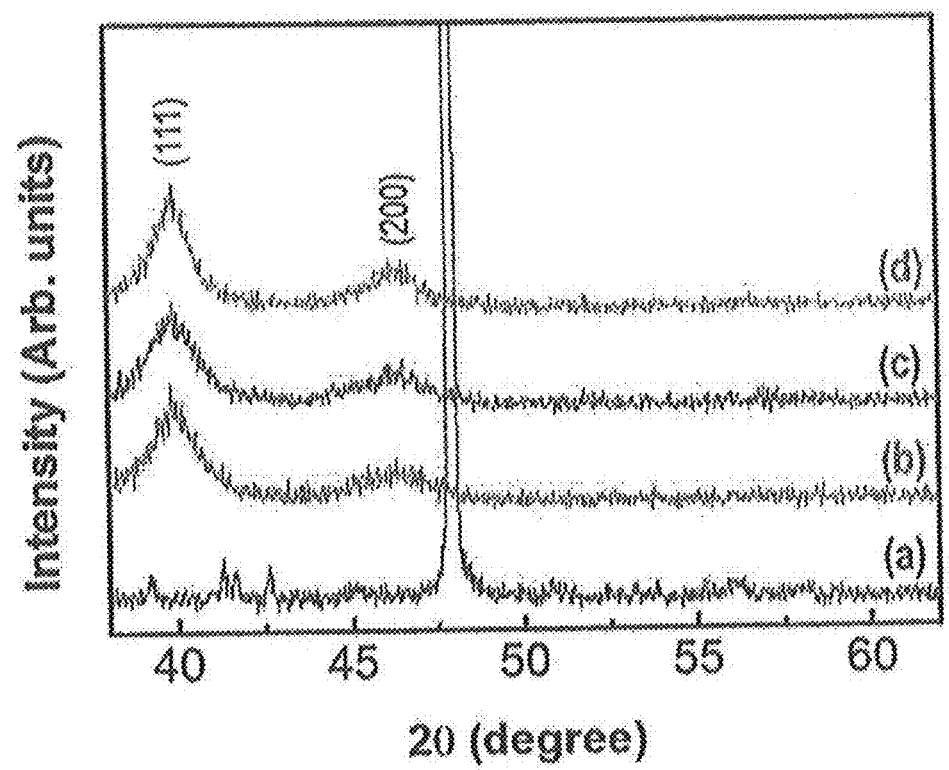
FIG. 29 is an XRD graph obtained by analyzing SWNTs having platinum catalyst particles formed by hydrogen plasma processing (hydrogen plasma dry etching) at different powers.

FIG. 29 is an XRD graph obtained by analyzing SWNTs having platinum catalyst particles formed by hydrogen plasma processing (hydrogen plasma dry etching) at different powers. FIG. 29A shows a result obtained by analyzing a sample before hydrogen plasma processing (hydrogen plasma dry etching), FIG. 29B shows a result obtained by analyzing a sample subjected to the hydrogen plasma processing at a power of 40 W, FIG. 29C shows a result obtained by analyzing a sample subjected to the hydrogen plasma processing at a power of 100 W, and FIG. 29D shows a result obtained by analyzing a sample subjected to the hydrogen plasma processing at a power of 200 W.

Referring to FIG. 29, all the samples subjected to the hydrogen plasma processing at a power of 40 W or more matched well the platinum crystalline peaks corresponding to JCPDS No. 04-0802.

FIG. 30A is a TEM photograph of the SEM photograph shown in FIG. 26, FIG. 30B is a high resolution TEM photograph, and FIG. 30C is a selected area electron diffraction (SAED) pattern photograph.

Figure 30:
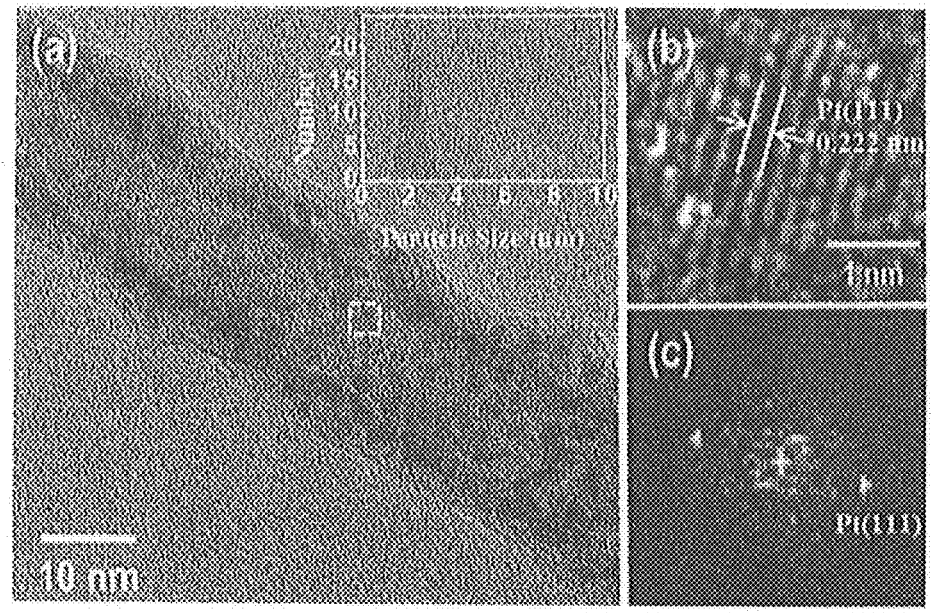
FIG. 30A is a transmission electron microscope (TEM) photograph of the SEM photograph shown in FIG. 26.
FIG. 30B is a high resolution TEM photograph.
FIG. 30C is a selected area electron diffraction (SAED) pattern photograph.

Referring to FIG. 30, it was confirmed that single crystalline platinum particles of a face centered cubic (FCC) structure having a diameter of 2 nm and a (111) direction were dispersed well on the SWNTs. On the basis of this fact, it can be seen that the hydrogen plasma processing (the hydrogen plasma dry etching) may be useful for a process of forming a platinum precursor on the SWNTs followed by reduction to form a catalyst.

Figure 31:
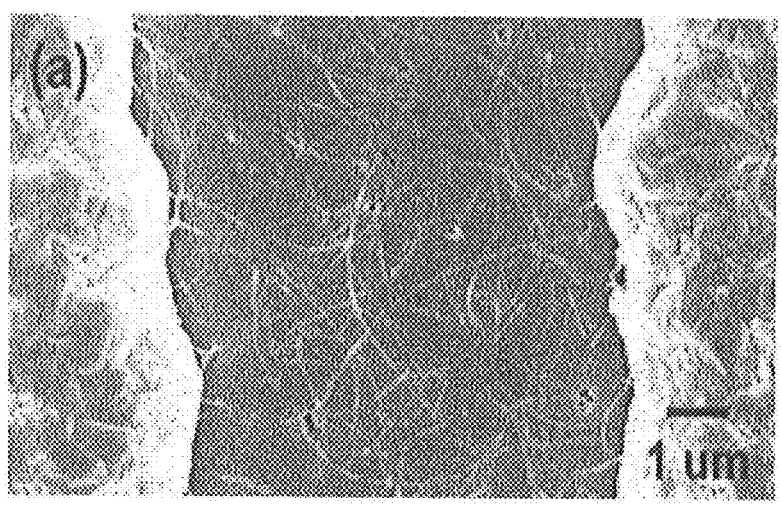
FIGS. 31 to 34 are SEM photographs of SWNTs arranged by applying different alternating electric field frequencies according to the method described with reference to FIG. 24.
Figure 32:
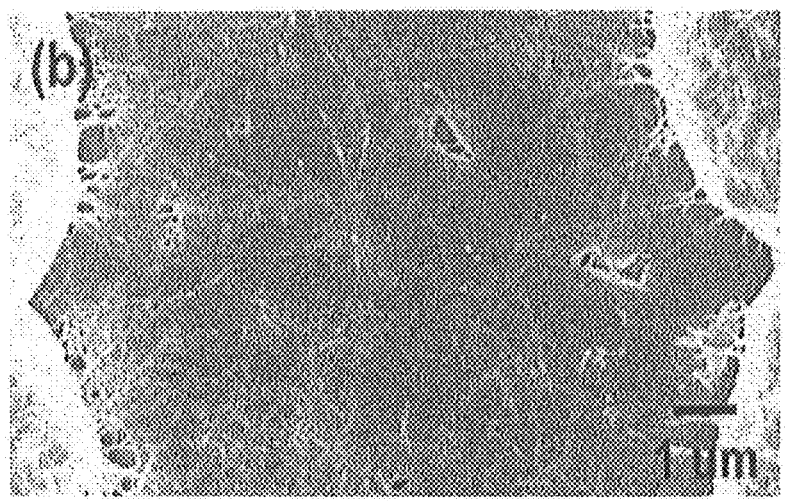
Figure 33:
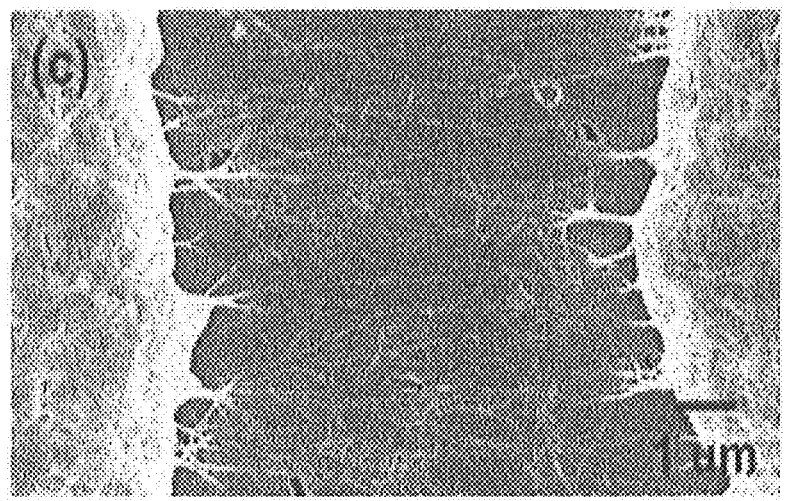
Figure 34:
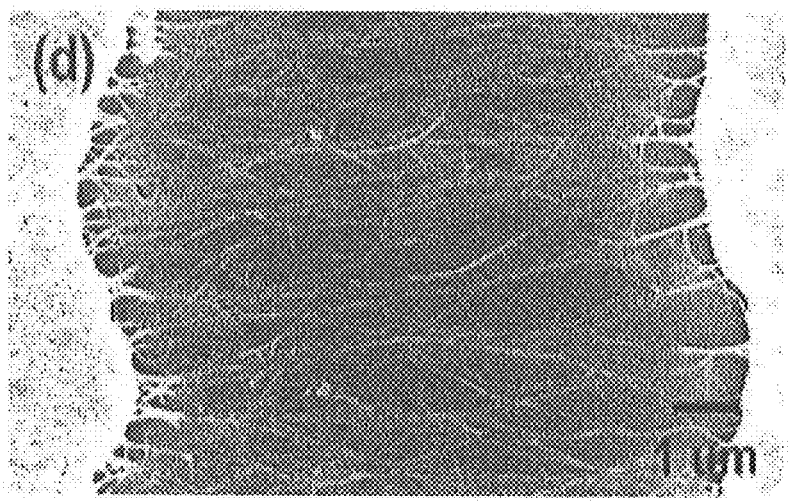

FIGS. 31 to 34 are SEM photographs of SWNTs arranged by applying different alternating electric field frequencies according to the method described with reference to FIG. 24. FIG. 31 shows a result obtained by analyzing a sample before an electric field was applied, FIG. 32 shows a result obtained by analyzing a sample after an electric field of 50 kHz was applied, FIG. 33 shows a result obtained by analyzing a sample after an electric field of 500 kHz was applied, and FIG. 34 shows a result obtained by analyzing a sample after an electric field of 5 MHz was applied.

Referring to FIGS. 31 to 34, it was confirmed that when a frequency of 50 kHz or less was applied, the SWNTs were randomly located regardless of an electrode arrangement direction, and when a frequency of 5 MHz was applied, the SWNTs crossed the electrodes and were uniformly arranged.

Figure 35:
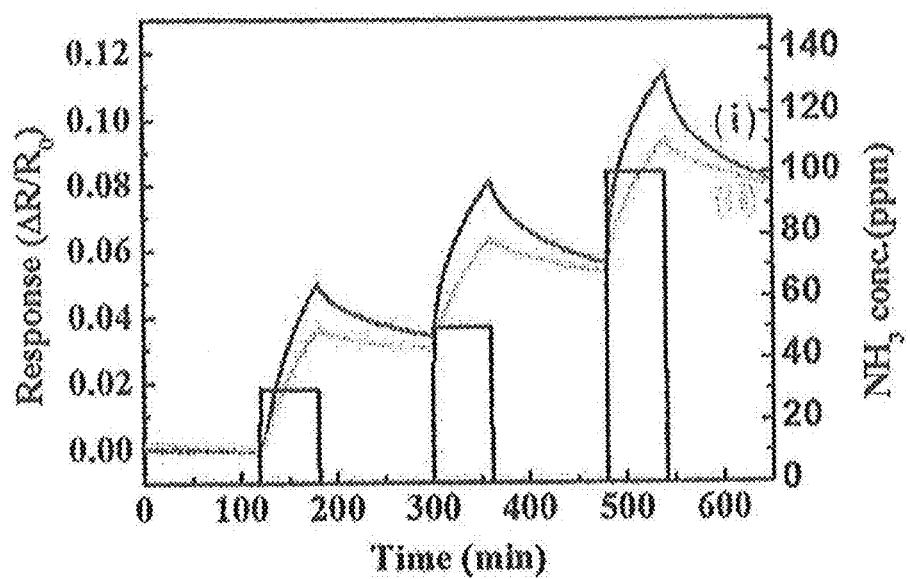
FIG. 35 is a graph showing a resistance change of SWNTs with respect to ammonia ($NH_3$) gas.

FIG. 35 is a graph showing a resistance change of SWNTs with respect to ammonia ($NH_3$) gas, wherein FIG. 351 shows a resistance change of the SWNTs coated (borne) with a platinum catalyst, and FIG. 3511 shows a resistance change of the SWNTs not coated (not borne) with a platinum catalyst.

FIG. 36 is a graph showing a resistance change of SWNTs with respect to hydrogen ($H_2$) gas, wherein FIG. 361 shows a resistance change of the SWNTs coated (borne) with a platinum catalyst, and FIG. 3611 shows a resistance change of the SWNTs not coated (not borne) with a platinum catalyst.

Referring to FIGS. 35 and 36, resistance values ($R_f$) when exposed to the ammonia gas and the hydrogen gas at room temperature and a resistance value ($R_0$) of the sensor in air were measured, and sensitivity was expressed as a resistance change amount ($R_f$-$R_0$)/$R_0$. It was confirmed that when a concentration of the ammonia gas was increased from 30 to 100 ppm at room temperature, the gas sensitivity of the SWNTs was increased as the platinum catalyst was coated (borne) (see FIG. 35). It was confirmed that when a concentration of the hydrogen gas was increased from 50 to 1000 ppm at room temperature, a weak interaction between the SWNTs and the hydrogen gas was amplified and the sensitivity was increased as the platinum catalyst was coated (borne) (see FIG. 36).

Experimental Example 4

In the present experimental example, a gas sensor in which rod-type tellurium was formed as a gas sensitive material by performing galvanic replacement on the internal electrodes (see FIG. 2) exposed through the sensing surface was prepared.

A galvanic replacement reaction, which is a type of electroless deposition, is a technique of plating a metal by a redox potential without a reducing agent. In the present experimental example, a tellurium structure in the form of a rod was formed as a gas sensitive material layer by replacing nickel internal electrodes with tellurium. To this end, the nickel internal electrodes were replaced with tellurium (Te) and grown. Nickel having a relatively low standard electrode potential was oxidized and tellurium having a relatively high reduction potential was reduced, by a galvanic replacement reaction, as shown in the following Reaction Formulas 1 to 3.

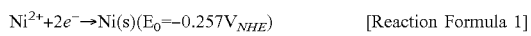
[Reaction Formula 1]

[Reaction Formula 2]

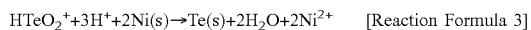
[Reaction Formula 3]

A shape and crystallinity of tellurium deposited by the galvanic replacement reaction may be adjusted according to a concentration, a reaction temperature, a reaction time, a hydrogen ion concentration index (pH), and the like of an electrolyte depending on tellurium and additives, and accordingly, gas sensitivity may be improved. Tellurium having a reduction potential higher than that of the electrode material (nickel) may be deposited by utilizing the above-described galvanic replacement reaction.

Figure 38:
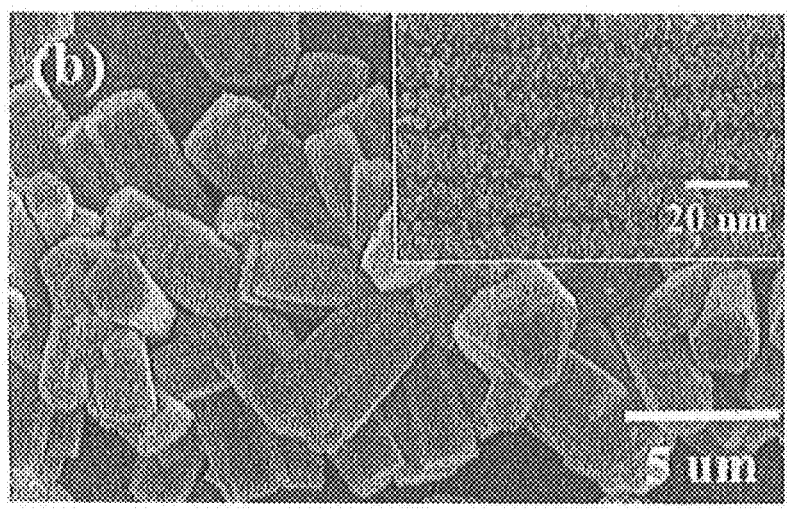
Figure 39:
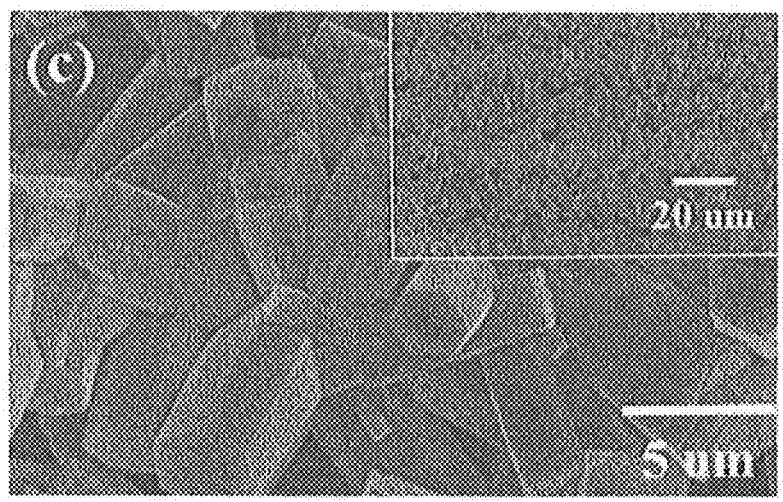
Figure 40:
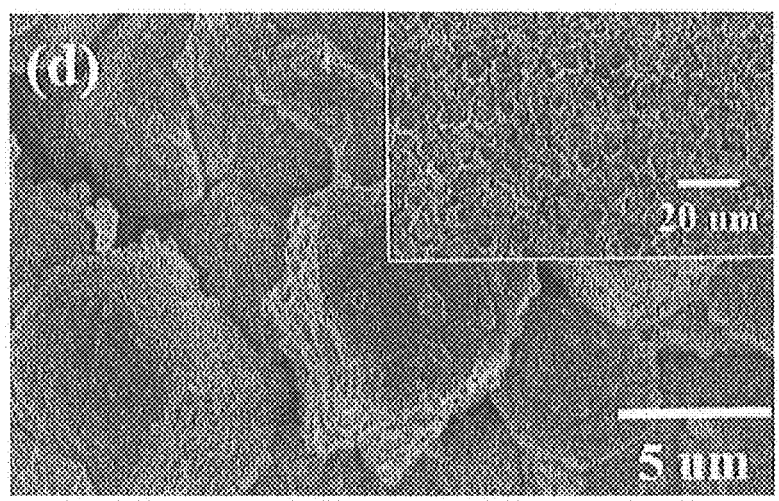

FIGS. 37 to 40 are SEM photographs obtained by analyzing a shape of a tellurium structure (a tellurium deposition material) according to a galvanic replacement reaction time. FIG. 37 shows a case in which a reaction was performed for 5 minutes, FIG. 38 shows a case in which a reaction was performed for 10 minutes, FIG. 39 shows a case in which a reaction was performed for 30 minutes, and FIG. 40 shows a case in which a reaction was performed for 60 minutes.

Referring to FIGS. 37 to 40, the sensor body (see FIG. 2) in which the internal electrodes were exposed through the sensing surface was impregnated with a 3.5% HCl solution for 30 seconds, a natural oxidation layer and impurities on the nickel internal electrode were removed, and the sensor body was cleaned with distilled water.

A galvanic replacement solution containing tellurium ions was prepared for galvanic replacement of the internal electrodes. 10 mM of tellurium dioxide ($TeO_2$) was added to 1 M of nitric acid ($HNO_3$), and was stirred at 80° C. for 5 hours to prepare a galvanic replacement solution. In order to deposit a gas sensitive material only on the sensing surface (the surface on which the internal electrodes were exposed) of the sensor body, a region (a region including an electrode terminal) except a region to be deposited was electrically insulated, was impregnated with the galvanic replacement solution, and was coated with tellurium.

FIG. 37 shows a case in which tellurium was plated by a galvanic replacement reaction for 5 minutes, FIG. 38 shows a case in which tellurium was plated by a galvanic replacement reaction for 10 minutes, FIG. 39 shows a case in which tellurium was plated by a galvanic replacement reaction for 30 minutes, and FIG. 40 shows a case in which tellurium was plated by a galvanic replacement reaction for 60 minutes. The deposited tellurium was grown in the form of a micro rod having a hexahedral structure. When a galvanic replacement reaction was performed for 5 min, 10 min, 30 min and 60 min, diameters were measured as 1.1 µm, 1.8 µm, 3.1 µm, and 5.8 µm, respectively. In the case of the sample subjected to the galvanic replacement reaction for 60 minutes (see FIG. 40), the sensing surface (the surface on which the internal electrodes all were exposed) was covered with a tellurium micro rod. This means that a junction between tellurium was effectively formed, and the junction served as an electrical path for electrons.

Figure 41:
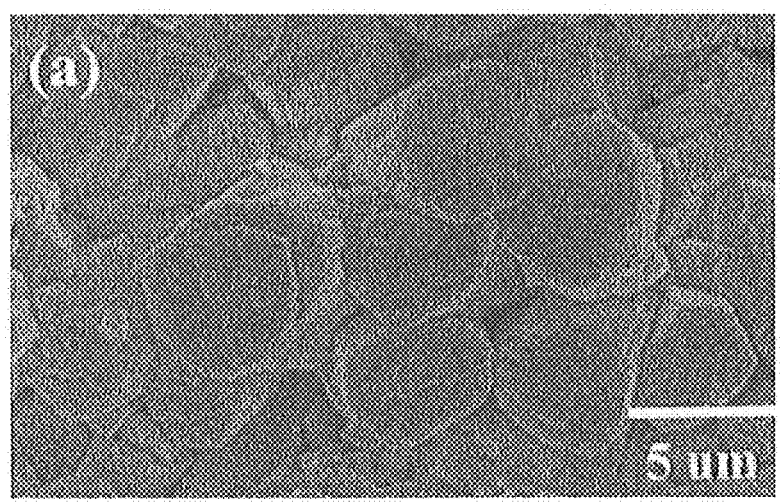
FIGS. 41 to 46 are SEM photographs obtained by analyzing a shape of a tellurium structure (a tellurium deposition material) according to a concentration of an additive of a galvanic replacement reaction solution.
Figure 42:
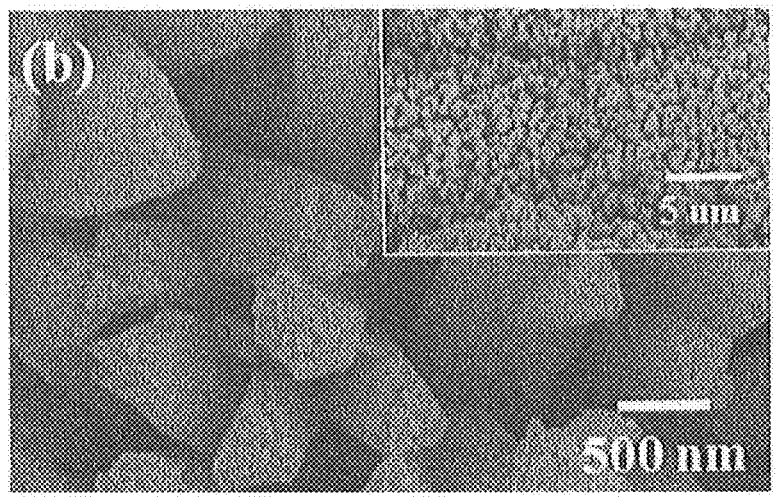
Figure 43:
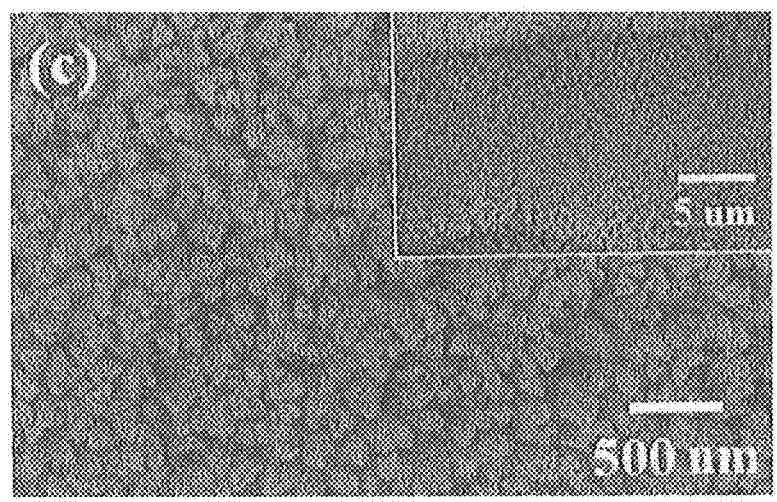
Figure 44:
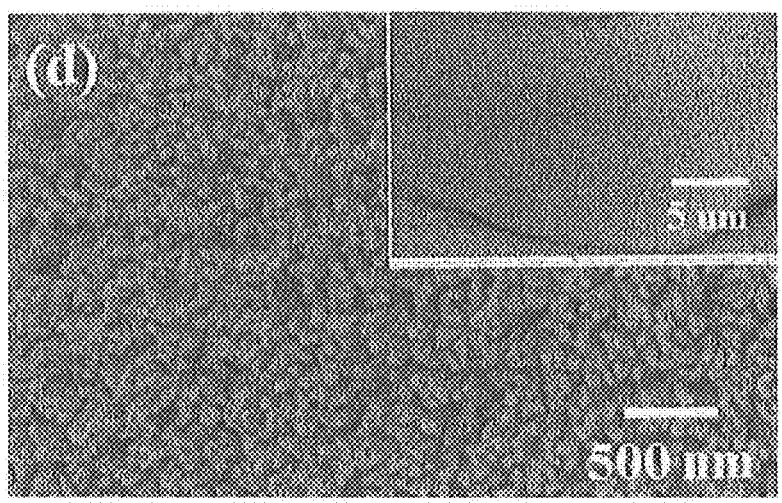
Figure 45:
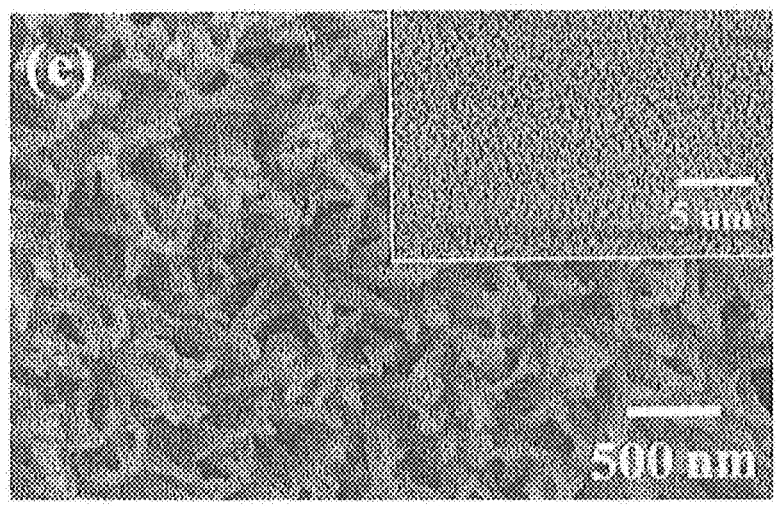
Figure 46:
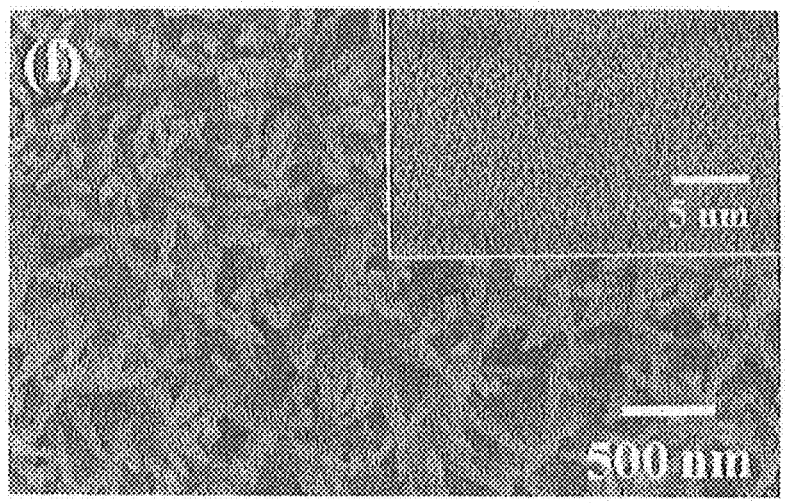

FIGS. 41 to 46 are SEM photographs obtained by analyzing a shape of a tellurium structure (a tellurium deposition material) according to a concentration of an additive of a galvanic replacement reaction solution. FIG. 41 shows a case in which a concentration of CTAB was adjusted to 1 mM, FIG. 42 shows a case in which a concentration of CTAB was adjusted to 3 mM, FIG. 43 shows a case in which a concentration of CTAB was adjusted to 14 mM, FIG. 44 shows a case in which a concentration of CTAB was adjusted to 27 mM, FIG. 45 shows a case in which a concentration of CTAB was adjusted to 137 mM, and FIG. 46 shows a case in which a concentration of CTAB was adjusted to 374 mM.

Referring to FIGS. 41 to 46, CTAB having different concentrations were added to adjust the shape of the tellurium structure (the tellurium deposition material) as the method of increasing sensitivity and bonding force of the tellurium micro rod shown in FIGS. 37 to 40. The CTAB may be bonded to specific surfaces of seed particles to adjust a growth direction, a growth rate, a structure, etc. of the tellurium structure (the tellurium deposition material). The additive may include POM, PVP, PDDA, SDS, and the like in addition to CTAB. FIG. 41 shows a result of adjusting the concentration of CTAB to 1 mM, FIG. 42 shows a result of adjusting the concentration of CTAB to 3 mM, FIG. 43 shows a result of adjusting the concentration of CTAB to 14 mM, FIG. 44 shows a result of adjusting the concentration of CTAB to 27 mM, FIG. 45 shows a result of adjusting the concentration of CTAB to 137 mM, and FIG. 46 shows a result of adjusting the concentration of CTAB to 374 mM. It was confirmed that the diameter of the deposited tellurium rod was decreased as the concentration of CTAB was increased.

Figure 47:
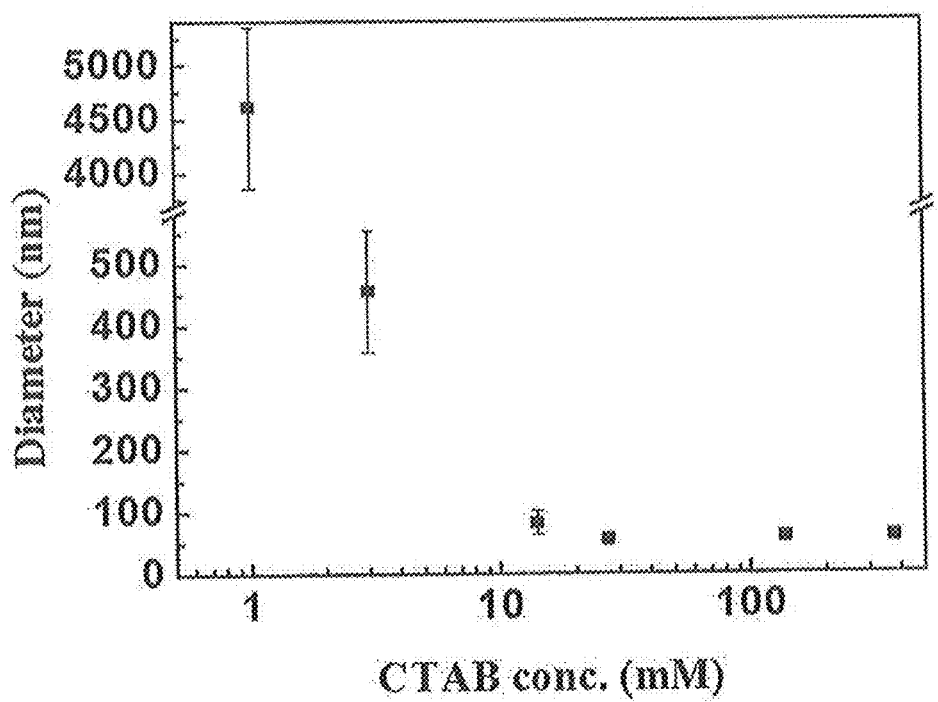
FIG. 47 is a graph showing a diameter of a tellurium structure (a tellurium deposition material) according to a concentration of cetyltrimethylammonium bromide (CTAB), which is an additive.

FIG. 47 is a graph showing a diameter of a tellurium structure (a tellurium deposition material) according to a concentration of CTAB, which is an additive.

Referring to FIG. 47, it was confirmed that as the concentration of CTAB was increased to 1 mM, 3 mM, 14 mM, 27 mM, 137 mM, and 374 mM, the diameter of the tellurium structure (the tellurium deposition material) was decreased to 4600 nm, 455 nm, 80 nm, 56 nm, 55 nm, and 55 nm, respectively. When the concentration of CTAB was 137 mM or more, the tellurium structure (the tellurium deposition material) had a small diameter and a large specific surface area, which was considered to be suitable for deposition conditions.

FIG. 48A is a TEM photograph of the tellurium structure (the tellurium deposition material) shown in FIG. 45, FIG. 48B is a high resolution TEM photograph, and FIG. 48C is an SAED pattern photograph.

Figure 48:
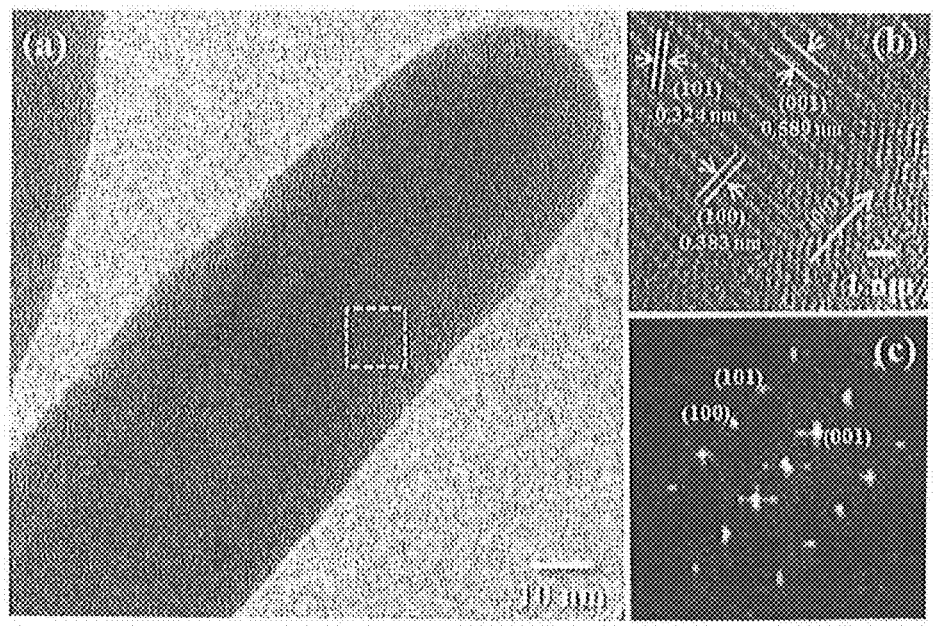
FIG. 48A is a TEM photograph of the tellurium structure (the tellurium deposition material) shown in FIG. 45.
FIG. 48B is a high resolution TEM photograph.
FIG. 48C is an SAED pattern photograph.

Referring to FIG. 48, it was clearly observed that the diameter of the tellurium structure (the tellurium deposition material) was 55 nm, lattice fringe intervals were 0.324, 0.383, and 0.589, and a crystal direction was [001]. Accordingly, it can be seen that the tellurium having a hexagonal crystal structure was deposited well.

Figure 49:
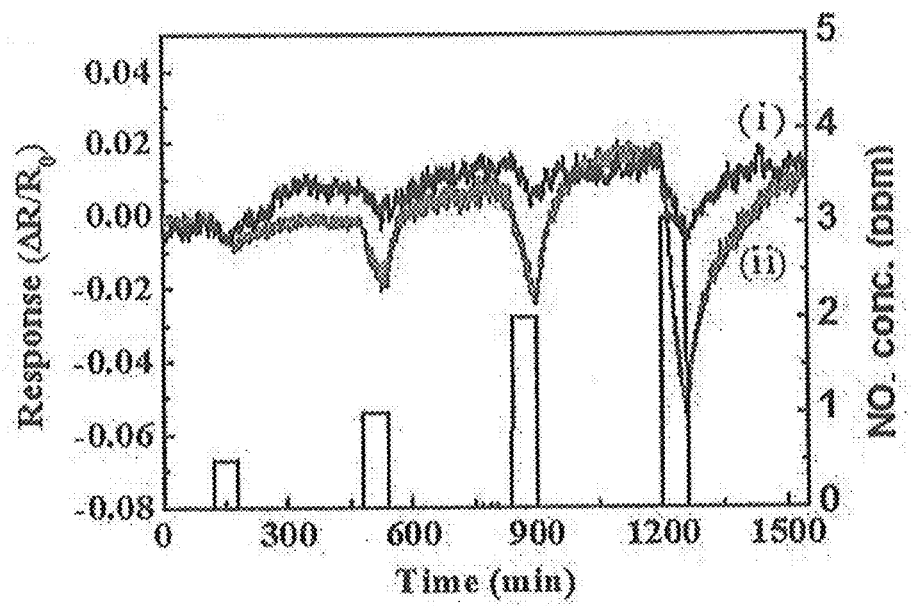
FIGS. 49 and 50 are graphs showing nitrogen dioxide ($NO_2$) gas sensing properties of tellurium nanorods grown in a solution containing 137 mM of CTAB.
Figure 50:
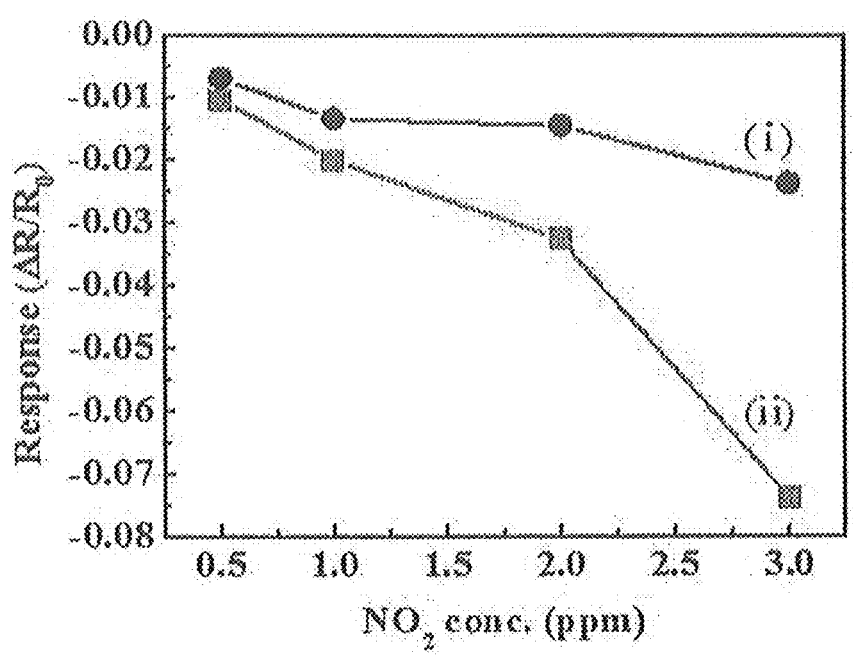

FIGS. 49 and 50 are graphs showing nitrogen dioxide ($NO_2$) gas sensing properties of tellurium nanorods grown in a solution containing 137 mM of CTAB. FIG. 49 is a graph showing the sensitivity (see FIG. 49I) of the tellurium micro rod grown in the solution not containing CTAB and the gas sensitivity (see FIG. 49II) of the tellurium nanorods grown in the solution containing CTAB, and FIG. 50 is a graph showing a change (see FIG. 50I) of the resistivity of tellurium according to the concentration of nitrogen dioxide of the tellurium micro rod grown in the solution not containing CTAB and a change (see FIG. 50II) of the resistivity of tellurium according to the concentration of nitrogen dioxide of the tellurium nanorods grown in the solution containing CTAB.

Referring to FIGS. 49 and 50, a resistance value ($R_f$) of the sensor when exposed to the ammonia gas and the hydrogen gas at room temperature and a resistance value ($R_0$) of the sensor in air were measured, and sensitivity was expressed as a resistance change amount $(R_f-R_0)/R_0$. A change of the resistivity of tellurium according to the concentration of nitrogen dioxide had a linear correlation (see FIG. 50). Referring to FIG. 49, it was confirmed that when the concentration of the nitrogen dioxide gas was increased from 0.5 to 3 ppm at room temperature, the gas sensitivity of the tellurium nanorods grown in the solution containing CTAB was greater than the sensitivity of the tellurium micro rod grown in the solution not containing CTAB (see FIG. 49). It was confirmed that the sensitivity was indicated to 0.084 ppm$^{-1}$ at 3 ppm, which is a TLV of the nitrogen dioxide gas, and a detection limit at room temperature was 0.5 ppm, which may be easily used as a next-generation gas sensor compared to a conventional tellurium thin film gas sensor.

While the embodiments of the present invention have been described in detail, the present invention is not limited to the above-described embodiments, and various modifications may be made by those skilled in the art without departing from the scope of the present invention.

INDUSTRIAL APPLICABILITY

According to the present invention, since the multilayer ceramic/metal platform to which an MLCP is applied may be simply cut and may be used as a sensor body, the manufacturing process may be simple, a manufacturing cost may be significantly reduced, and is industrially applicable.

The invention claimed is:

1. A gas sensor comprising a sensor body, wherein:
    the sensor body is formed by cutting a multi-layer ceramic/metal platform to which a multi-layer ceramic/metal process is applied in a layered direction in a form in which a plurality of sequential layer structures of a ceramic dielectric and a metal are layered;
    the sensor body includes at least one layered body in which a ceramic dielectric, a first internal electrode, a ceramic dielectric, and a second internal electrode are sequentially layered;
    the first internal electrode and the second internal electrode are exposed through a cut surface formed by the cutting;
    the first internal electrode is electrically connected to a first electrode terminal provided on a first side surface of the sensor body;
    the second internal electrode is electrically connected to a second electrode terminal provided on a second side surface of the sensor body facing the first side surface;
    the first internal electrode and the second internal electrode are exposed to form a sensing surface on at least one side surface of the sensor body excluding the side surfaces on which the first electrode terminal and the second electrode terminal are provided;
    a gas sensitive material layer for gas detection is formed on a part or whole of the sensing surface;
    the first and second internal electrodes exposed on the sensing surface are replaced with chalcogens by a galvanic replacement reaction to form the gas sensitive material layer;
    the chalcogens include at least one material selected from among selenium (Se) and tellurium (Te); and
    the chalcogens have a rod-type structure.

2. The gas sensor of claim 1, wherein the ceramic dielectric includes at least one ceramic selected from among alumina ($Al_2O_3$), magnesia (MgO), silica ($SiO_2$), zirconia ($ZrO_2$), and barium titanate ($BaTiO_3$).

3. The gas sensor of claim 1, wherein the gas sensitive material layer includes an oxide semiconductor capable of sensing a gas.

4. The gas sensor of claim 3, wherein the oxide semiconductor includes at least one N-type semiconductor selected from among tin oxide ($SnO_2$), titanium oxide ($TiO_2$), zinc oxide (ZnO), tungsten oxide ($WO_3$), cadmium oxide (CdO), iron oxide ($Fe_2O_3$), and indium oxide ($In_2O_3$).

5. The gas sensor of claim 3, wherein the oxide semiconductor includes at least one P-type semiconductor selected from among nickel oxide (NiO), copper oxide (CuO), chromium oxide ($Cr_2O_3$), and cobalt oxide ($Co_3O_4$).

6. The gas sensor of claim 1, wherein the gas sensitive material layer includes carbon nanotubes capable of sensing a gas.

7. The gas sensor of claim 6, wherein the carbon nanotubes are coated with a catalyst for improving gas sensitivity.

8. The gas sensor of claim 7, wherein the catalyst includes at least one metal selected from among platinum (Pt), palladium (Pd), gold (Au), silver (Ag), iridium (Ir), rhodium (Rh), and ruthenium (Ru).

9. A gas sensor comprising a sensor body, wherein:

the sensor body is formed by cutting a multi-layer ceramic/metal platform to which a multi-layer ceramic/metal process is applied in a layered direction in a form in which a plurality of sequential layer structures of a ceramic dielectric and a metal are layered;

the sensor body includes at least one layered body in which a ceramic dielectric, a first internal electrode, a ceramic dielectric, and a second internal electrode are sequentially layered;

the first internal electrode and the second internal electrode are exposed through a cut surface formed by the cutting;

the first internal electrode is electrically connected to a first electrode terminal provided on a first side surface of the sensor body;

the second internal electrode is electrically connected to a second electrode terminal provided on a second side surface of the sensor body facing the first side surface;

the first internal electrode and the second internal electrode are exposed to form a sensing surface on at least one side surface of the sensor body excluding the side surfaces on which the first electrode terminal and the second electrode terminal are provided;

a gas sensitive material layer for gas detection is formed on a part or whole of the sensing surface;

the first and second internal electrodes exposed on the sensing surface are replaced with chalcogenide by a galvanic replacement reaction, a topotactic reaction and a cation exchange reaction to form the gas sensitive material layer;

the chalcogenide includes at least one chalcogen compound selected from among metal telluride, metal selenide, and metal sulfide; and the chalcogenide has a rod-type structure.

* * * * *